US009857589B2

(12) United States Patent
Lundberg

(10) Patent No.: US 9,857,589 B2
(45) Date of Patent: Jan. 2, 2018

(54) GESTURE REGISTRATION DEVICE, GESTURE REGISTRATION PROGRAM, AND GESTURE REGISTRATION METHOD

(71) Applicant: MIRAMA SERVICE INC., New Castle, DE (US)

(72) Inventor: Johannes Lundberg, Tokyo (JP)

(73) Assignee: MIRAMA SERVICE INC., New Castle (DE)

( * ) Notice: Subject to any disclaimer, the term of this patent is extended or adjusted under 35 U.S.C. 154(b) by 0 days.

(21) Appl. No.: 14/768,241

(22) PCT Filed: Apr. 12, 2013

(86) PCT No.: PCT/JP2013/002524
§ 371 (c)(1),
(2) Date: Aug. 17, 2015

(87) PCT Pub. No.: WO2014/128773
PCT Pub. Date: Aug. 28, 2014

(65) Prior Publication Data
US 2015/0378158 A1    Dec. 31, 2015

(30) Foreign Application Priority Data
Feb. 19, 2013    (WO) ................. PCT/JP2013/000909

(51) Int. Cl.
*H04N 13/04*    (2006.01)
*G06T 7/20*     (2017.01)
(Continued)

(52) U.S. Cl.
CPC .......... *G02B 27/017* (2013.01); *G06F 3/011* (2013.01); *G06F 3/017* (2013.01); *G06F 3/03* (2013.01);
(Continued)

(58) Field of Classification Search
CPC .................. G06F 3/011; G06F 3/017
See application file for complete search history.

(56) References Cited

U.S. PATENT DOCUMENTS

| 6,363,160 B1* | 3/2002 | Bradski ............... G06K 9/00 382/103 |
| 8,179,604 B1* | 5/2012 | Prada Gomez .... G02B 27/0093 345/8 |

(Continued)

FOREIGN PATENT DOCUMENTS

| JP | 2012-094060 | 5/2012 |
| JP | 2012-175282 | 9/2012 |

(Continued)

OTHER PUBLICATIONS

International Preliminary Report on Patentability for International Patent Application No. PCT/JP2013/002524 dated Aug. 25, 2015, 7 pages.
(Continued)

*Primary Examiner* — Patrick F Marinelli
(74) *Attorney, Agent, or Firm* — Amin, Turocy & Watson LLP

(57) ABSTRACT

A gesture registration device, a gesture registration program and a gesture registration method that can rapidly and simply obtain and stock gesture data are provided. The gesture registration device of the present invention includes an external-shape detecting unit, an analyzing unit, and a recording unit. The external-shape detecting unit detects an external shape of an object having a predetermined form. The analyzing unit performs at least analysis of an external-shape feature part and analysis of the value for at least either the position or the direction of the external shape feature part, from the detected the external shape of the object. The recording unit records a result by the analysis unit as gesture data.

19 Claims, 36 Drawing Sheets

(51) Int. Cl.

| | | |
|---|---|---|
| *G06T 19/00* | (2011.01) | |
| *G06K 9/48* | (2006.01) | |
| *G06K 9/00* | (2006.01) | |
| *G06F 3/0484* | (2013.01) | |
| *G06F 3/0482* | (2013.01) | |
| *G06F 3/048* | (2013.01) | |
| *G06F 3/03* | (2006.01) | |
| *G06F 3/01* | (2006.01) | |
| *G02B 27/01* | (2006.01) | |
| *G06K 9/46* | (2006.01) | |

(52) U.S. Cl.
CPC ............ *G06F 3/0304* (2013.01); *G06F 3/048* (2013.01); *G06F 3/0482* (2013.01); *G06F 3/04842* (2013.01); *G06F 3/04845* (2013.01); *G06K 9/00355* (2013.01); *G06K 9/00375* (2013.01); *G06K 9/00382* (2013.01); *G06K 9/00389* (2013.01); *G06K 9/4609* (2013.01); *G06K 9/48* (2013.01); *G06T 7/20* (2013.01); *G06T 19/006* (2013.01); *H04N 13/0495* (2013.01); *G02B 2027/0178* (2013.01); *G06T 2200/04* (2013.01); *G06T 2207/10004* (2013.01); *G06T 2207/20228* (2013.01); *G06T 2207/30196* (2013.01); *G06T 2210/56* (2013.01); *H04N 13/0429* (2013.01)

(56) References Cited

U.S. PATENT DOCUMENTS

| | | | | |
|---|---|---|---|---|
| 8,196,066 | B1* | 6/2012 | Ouyang | G06F 3/04883 715/708 |
| 8,472,665 | B2* | 6/2013 | Hildreth | G06F 1/1626 382/103 |
| 8,558,759 | B1* | 10/2013 | Prada Gomez | G06F 3/017 345/156 |
| 8,836,768 | B1* | 9/2014 | Rafii | G06F 3/017 345/420 |
| 9,024,842 | B1* | 5/2015 | Prada Gomez | G06F 3/017 345/156 |
| 9,141,194 | B1* | 9/2015 | Keyes | G06F 3/017 |
| 9,207,767 | B2* | 12/2015 | Bell | G06F 3/017 |
| 9,304,674 | B1* | 4/2016 | Townsend | G06F 3/0487 |
| 9,310,891 | B2* | 4/2016 | Rafii | G06F 3/017 |
| 9,448,636 | B2* | 9/2016 | Balzacki | G06F 3/017 |
| 2005/0025345 | A1* | 2/2005 | Ohta | B60H 1/0065 382/116 |
| 2008/0273755 | A1* | 11/2008 | Hildreth | G06F 1/1626 382/103 |
| 2010/0073287 | A1* | 3/2010 | Park | G06F 3/017 345/157 |
| 2010/0333045 | A1* | 12/2010 | Gueziec | G06F 3/016 715/863 |
| 2011/0107216 | A1* | 5/2011 | Bi | G06F 3/011 715/716 |
| 2011/0141050 | A1* | 6/2011 | Miura | G06F 3/04883 345/173 |
| 2011/0158476 | A1* | 6/2011 | Fahn | G06K 9/00288 382/103 |
| 2012/0062736 | A1* | 3/2012 | Xiong | G06F 3/017 348/143 |
| 2012/0206584 | A1* | 8/2012 | Serizawa | G06F 3/0416 348/77 |
| 2012/0314902 | A1* | 12/2012 | Kimura | G06F 3/017 382/103 |
| 2013/0007614 | A1* | 1/2013 | Bell | G06F 3/017 715/709 |
| 2013/0007616 | A1* | 1/2013 | Bell | G06F 3/017 715/709 |
| 2013/0222703 | A1 | 8/2013 | Yarita et al. | |
| 2013/0229396 | A1* | 9/2013 | Huebner | H04N 9/3147 345/207 |
| 2013/0278501 | A1* | 10/2013 | Bulzacki | G06F 3/017 345/157 |
| 2014/0071061 | A1* | 3/2014 | Lin | G06F 3/04883 345/173 |
| 2014/0139429 | A1* | 5/2014 | Menadeva | G06F 3/017 345/156 |
| 2014/0225918 | A1* | 8/2014 | Mittal | G06F 3/017 345/633 |
| 2015/0062003 | A1* | 3/2015 | Rafii | G06F 3/017 345/156 |
| 2015/0169070 | A1* | 6/2015 | Harp | G06F 3/017 345/419 |
| 2015/0370321 | A1* | 12/2015 | Lundberg | G06K 9/48 382/190 |
| 2015/0378158 | A1* | 12/2015 | Lundberg | G06K 9/48 345/8 |
| 2015/0378159 | A1* | 12/2015 | Lundberg | G02B 27/017 345/8 |
| 2015/0381970 | A1* | 12/2015 | Sugimoto | H04N 13/0239 348/51 |
| 2015/0381973 | A1* | 12/2015 | Yamamoto | G06F 3/042 348/51 |
| 2016/0004320 | A1* | 1/2016 | Lundberg | G06K 9/48 345/633 |
| 2016/0004907 | A1* | 1/2016 | Lundberg | G06K 9/48 348/53 |
| 2016/0004908 | A1* | 1/2016 | Lundberg | G06K 9/48 382/103 |
| 2016/0021353 | A1* | 1/2016 | Lundberg | H04N 13/0239 348/54 |

FOREIGN PATENT DOCUMENTS

| | | |
|---|---|---|
| JP | 2012-181809 | 9/2012 |
| JP | 2012-528405 | 11/2012 |
| JP | 5148004 | 2/2013 |
| WO | 2010-138743 | 12/2010 |

OTHER PUBLICATIONS

International Search Report for International Patent Application No. PCT/JP2013/002524 dated Aug. 13, 2013, 4 pages.

* cited by examiner

GESTURE REGISTRATION DEVICE, GESTURE REGISTRATION PROGRAM, AND GESTURE REGISTRATION METHOD

TECHNICAL FIELD

The present invention relates to a gesture registration device, a gesture registration program, and a gesture registration method.

BACKGROUND ART

Various techniques using gestures as interfaces have been developed.

National Publication of International Patent Application No. 2012-528405 (Patent Literature 1) discloses a method including a step of detecting and translating an orientation in which an input device is currently operated and transitions between a plurality of orientations of the input device, wherein the input device comprises a hand-held housing that includes a processor, a step of automatically controlling selection of an input mode of the plurality of input modes in response to the orientation and the transitions, and a step of controlling a three-space object coupled to the gestural control system according to the input mode. Patent Literature 1 further discloses that the detecting uses optical tracking and that the method includes step of tracking at least one tag connected to the input device.

CITATION LIST

Patent Literature

Patent Literature 1: National Publication of International Patent Application No. 2012-528405

SUMMARY OF INVENTION

Technical Problem

In the method disclosed in Patent Literature 1, any part or parts of a user's body are tracked with use of at least two cameras which may be four, six or eight cameras. The cameras used, which are so-called motion capture cameras, directly detect markers attached to an object or the like.

However, the method disclosed in Patent Literature 1 assumes that a marker is attached to an object or the like. Thus, obtaining gesture data takes much labor.

Therefore, the object of the present invention is to provide a gesture registration device, a gesture registration program, and a gesture registration method that can rapidly and simply obtain and stock gesture data.

Solution to Problem (1)

A gesture registration device according to one aspect includes an external-shape detecting unit, an analyzing unit, and a recording unit. The external-shape detecting unit detects an external shape of an object having a predetermined form. The analyzing unit performs at least analysis of an external-shape feature part and analysis of a value of at least either a position or a direction of the external-shape feature part, from the detected external shape of the object. The recording unit records a result by the analyzing unit as gesture data.

Consequently, based on the data of the detected external shape of the object, the external-shape feature part and the position and/or the direction thereof can be analyzed and the analysis result can be registered so that the gesture data can be rapidly and simply obtained and stocked.

Furthermore, predetermined gesture data can be recorded according to a user's gesture, and used for operations of an application or the like. Particularly, the gesture registration device is effective when the types of gestures that can be expressed by a user have a limit due to physical features of the user or the like.

(2)

The gesture registration device may further include a deleting unit. The deleting unit deletes the gesture data from the recording unit.

Consequently, both recording and deleting of the gesture data are possible so that the customizing property in gesture setting is improved.

(3)

The gesture registration device may further include an associating unit. The associating unit associates gesture data indicating a predetermined form with a predetermined operation and causes the recording unit to record the gesture data.

Consequently, the registered gesture data can be used as an operation command.

(4)

The gesture registration device may further include a releasing unit. The releasing unit releases association of the gesture data indicating a predetermined form with the predetermined operation.

Consequently, only the association with the predetermined operation can be released without deleting the recorded gesture data. Thus, for example, the gesture data can be associated with another operation so that a new gesture command can be easily created. Therefore, the customizing property in gesture setting is further improved.

(5)

The external-shape detecting unit may detect a serial external shape of the object varying with time and the analyzing unit may further perform analysis of the time variation of the external-shape feature part.

Consequently, the transition of the operation is detected and analyzed so that, particularly, a gesture including an operation can be registered simply.

(6)

The external-shape detecting unit may detect the external shape of the object a plurality of times.

Consequently, a plurality of pieces of the external-shape data of a predetermined form can be obtained so that the gesture data can be registered in a more recognizable manner.

(7)

The object may be part of a human body including at least one of a finger, a palm, a hand, an arm and an elbow.

Consequently, a gesture using part of a human body can be registered simply. Thus, for example, a gesture can be registered according to physical features of a user.

(8)

The external-shape detecting unit may be a moving-image photographing device, and may detect a serial external shape by continuing to image the object having the predetermined form for a predetermined time.

Consequently, a plurality of pieces of data of the serial external shape of the object having the predetermined form can be obtained so that, for example, a gesture including an operation can be set. In contrast, a gesture of a stationary sign including no operation basically (that is, not intending the transition of an operation) can be set in such a way that a variety of forms that can be acceptable as the gesture are included.

(9)

The external-shape detecting unit may be a still-image photographing device, and may detect a plurality of the external shapes by imaging the object having the predetermined form a plurality of times.

Consequently, the plurality of pieces of data of the external shape of the object having the predetermined form can be obtained so that, for example, a gesture including an operation can be set. In contrast, a gesture of a stationary sign including no operation basically (that is, not intending the transition of an operation) can be set in such a way that a variety of forms that can be acceptable as the gesture are included.

(10)

The external-shape feature part may be at least any one of the number, the position, the angle of fingers having a predetermined form, and the angle of an arm.

Consequently, gesture data can be registered more precisely.

(11)

A head-mounted display device according to another aspect includes the gesture registration device according to the aspect.

Consequently, registration of gestures can be performed with the device itself attached to a body. Furthermore, for example, registration of gestures by both hands can be performed because the both hands are free.

(12)

A gesture registration program according to still another aspect includes an external-shape detection process, an analysis process, and a recording process. In the external-shape detection process, an external shape of an object having a predetermined form is detected. In the analysis process, at least analysis of an external-shape feature part and analysis of a value of at least either a position or a direction of the external-shape feature part, are performed from the detected external shape of the object. In the recording process, a result in the analysis process is recorded as gesture data.

Consequently, the external-shape feature part and the position and/or direction thereof can be analyzed based on the data of the detected external shape of the object and the analysis result can be registered so that the gesture data can be rapidly and simply obtained and stocked.

(13)

The gesture registration program may further include a deletion process. In the deletion process, the gesture data is deleted.

Consequently, both recording and deleting of the gesture data are possible so that the customizing property in gesture setting is improved.

(14)

The gesture registration program may further include an association process. In the association process, the gesture data indicating a predetermined form is recorded by being associated with a predetermined operation.

Consequently, the registered gesture data can be used as an operation command.

(15)

The gesture registration program may further include a release process. In the release process, association of the gesture data indicating the predetermined form with the predetermined operation is released.

Consequently, only the association with the predetermined operation can be released without deleting the recorded gesture data. Thus, for example, the gesture data can be associated with another operation so that a new gesture command can be easily created. Therefore, the customizing property in gesture setting is further improved.

(16)

The external-shape detection process may be a moving-image photographing process, in which a serial external shape may be detected by continuing to image the object having the predetermined form for a predetermined time.

Consequently, a plurality of pieces of data of the serial external shape of the object having the predetermined form can be obtained so that, for example, a gesture including an operation can be set. In contrast, a gesture of a stationary sign including no operation basically (that is, not intending the transition of an operation) can be set in such a way that a variety of forms that can be acceptable as the gesture are included.

(17)

The external-shape detection process may be a still-image photographing process, in which a plurality of the external shapes may be detected by imaging the object having the predetermined form a plurality of times.

Consequently, the plurality of pieces of data of the external shape having the predetermined form can be obtained so that, for example, a gesture including an operation can be set. In contrast, a gesture of a stationary sign including no operation basically (that is, not intending the transition of an operation) can be set in such a way that a variety of forms that can be acceptable as the gesture are included.

(18)

A gesture registration method according to still another aspect includes an external-shape detection step, an analysis step, and a recording step. In the external-shape detection step, an external shape of an object having a predetermined form is detected. In the analysis step, at least analysis of an external-shape feature part and analysis of a value of at least either a position or a direction of the external-shape feature part, are performed from the detected external shape of the object. In the recording step, a result in the analysis step is recorded as gesture data.

Consequently, based on the data of the detected external shape of the object, the external-shape feature part and the position and/or direction thereof can be analyzed and the analysis result can be registered so that gesture data can be rapidly and simply obtained and stocked.

(19)

The gesture registration method may further include a deletion step. In the deletion step, the gesture data is deleted.

Consequently, both recording and deleting of the gesture data are possible so that the customizing property in gesture setting is improved.

(20)

The gesture registration method may further include an association step. In the association step, gesture data indicating the predetermined form is recorded by being associated with a predetermined operation.

Consequently, the registered gesture data can be used as an operation command.

(21)

The gesture registration method may further include a release step. In the release step, association of gesture data indicating the predetermined form with the predetermined operation is released.

Consequently, only the association with the predetermined operation can be released without deleting the recorded gesture data. Thus, for example, the gesture data can be associated with another operation so that a new gesture command can be created easily. Therefore, the customizing property in gesture setting is further improved.

(22)

The external-shape detection step may be a moving-image photographing step, in which a serial external shape may be detected by continuing to image the object having the predetermined form for a predetermined time.

Consequently, a plurality of pieces of data of the serial external shape of the object having the predetermined form can be obtained so that, for example, a gesture including an operation can be set. In contrast, a gesture of a stationary sign including no operation basically (that is, not intending the transition of an operation) can be set in such a way that a variety of forms that can be acceptable as the gesture are included.

(23)

The external-shape detection step may be a still-image photographing step, in which a plurality of the external shapes may be detected by imaging the object having the predetermined form a plurality of times.

Consequently, the plurality of pieces of data of the external shapes of the object having the predetermined forms can be obtained so that, for example, a gesture including an operation can be set. In contrast, a gesture of a stationary sign including no operation basically (that is, not intending the transition of an operation) can be set in such a way that a variety of forms that can be acceptable as the gesture are included.

Advantageous Effects of Invention

The present invention can provide a gesture registration device, a gesture registration program, and a gesture registration method that allow a user to rapidly and simply obtain and stock gesture data.

Figure 1:
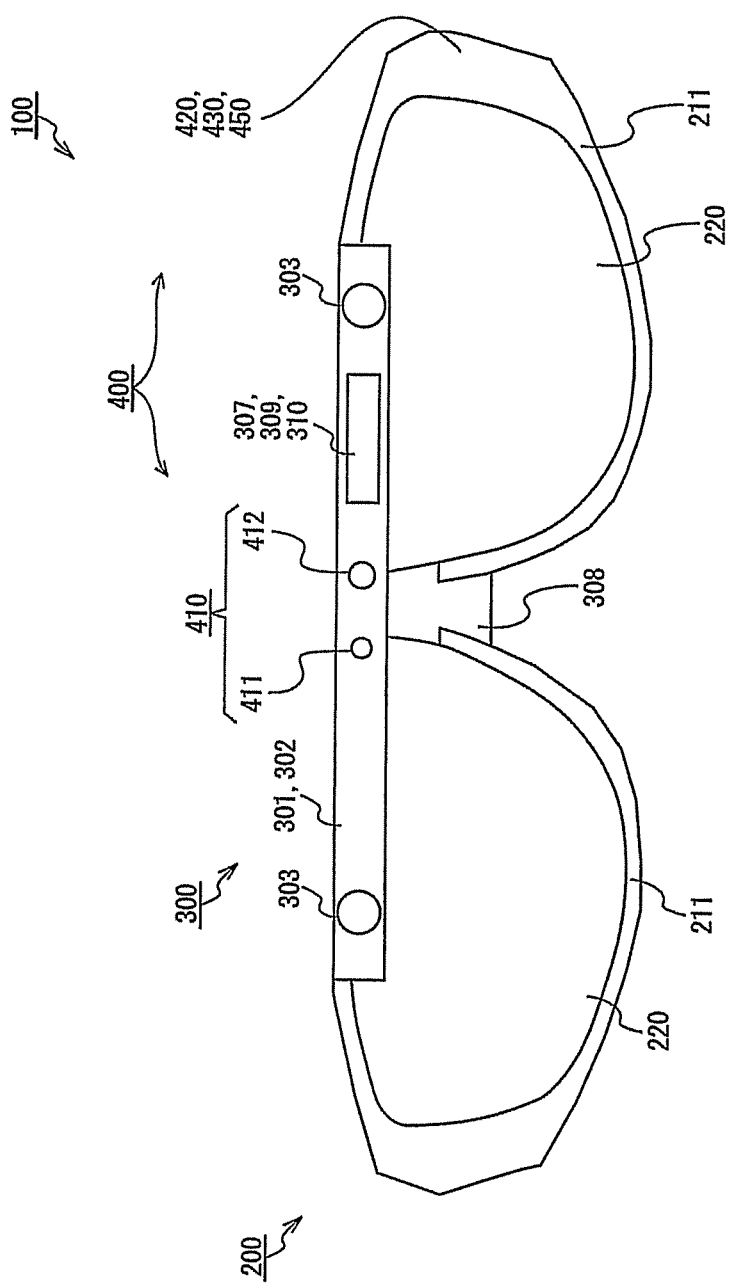
FIG. 1 is a schematic external front view illustrating an example of a basic configuration of a glasses display device 100 according to an embodiment.

REFERENCE SIGNS LIST 100 glasses display device
220 semi-transmissive display
221 advertisement
2203D virtual image display region (common region)
300 communication system
303 camera unit
410 infrared ray detection unit
410c manipulation region
420 gyroscope unit
430 acceleration detection unit 410 3D three-dimensional space detection region
450 control unit
454 anatomy recognition unit
456 gesture recognition unit
460 event service unit
461 calibration service unit
701 to 707 view
900 I/O device
H1 hand
H2, H3 shadow
RP right shoulder joint
LP left shoulder joint
OF outer shape
$p_n$, $p_0$, $p_1$ vertex
$PP_1$ reference line segment
$pp_2$ side
$pp_k$ side
P0 tip point
P1 base point
C maximum inscribed circle
V3 face recognition application screen
V5 SNS application screen Description of Embodiment Hereinafter, an embodiment of the present invention is described with reference to the drawings. In the following description, the same reference signs are given to the same components. The names and functions thereof are the same. Accordingly, detailed description thereof is not repeated.

Moreover, the present invention is not limitatively applied to the following glasses display device, and can also be applied to other I/O devices, display devices, televisions, monitors, projectors, and the like.

(Configuration Outline of Glasses Display Device)

Figure 2:
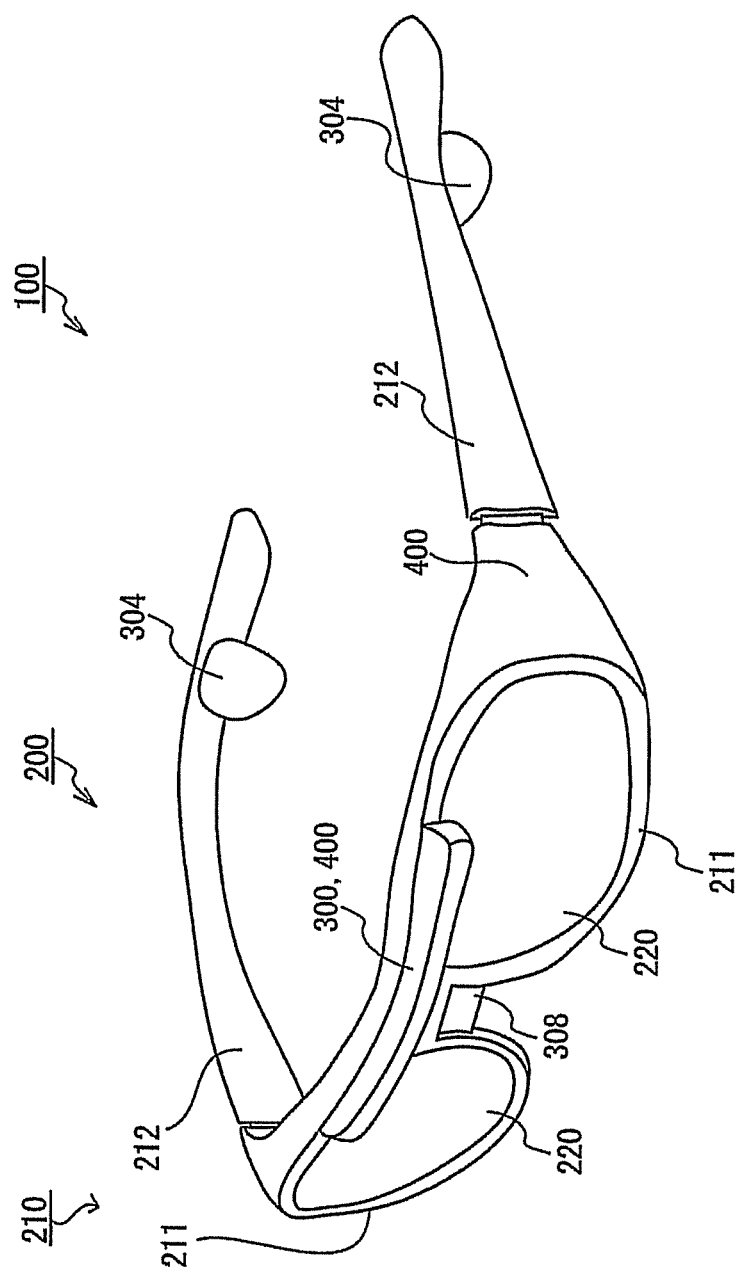
FIG. 2 is a schematic external perspective view illustrating an example of the glasses display device 100.

FIG. 1 is a schematic external front view illustrating an example of a basic configuration of a glasses display device 100 according to an embodiment, and FIG. 2 is a schematic external perspective view illustrating an example of the glasses display device 100.

As illustrated in FIG. 1 or FIG. 2, the glasses display device 100 is a glasses-shaped display device. As described later, the glasses display device 100 is used while being attached to the face of a user.

As illustrated in FIG. 1 and FIG. 2, the glasses display device 100 mainly includes a glasses unit 200, a communication system 300, and an operation system 400.

(Glasses Unit 200)

As illustrated in FIG. 1 and FIG. 2, the glasses unit 200 includes a glasses frame 210 and a pair of semi-transmissive displays 220. The glasses frame 210 mainly includes a rim unit 211 and a temple unit 212.

The pair of semi-transmissive displays 220 is supported by the rim unit 211 of the glasses frame 210.

In the present embodiment, the rim unit 211 of the glasses display device 100 is provided with the pair of semi-transmissive displays 220. Not limited thereto, the rim unit 211 of the glasses display device 100 may be provided with lenses such as normal sunglasses lenses, ultraviolet protection lenses, or glasses lenses, and one semi-transmissive display 220 or the pair of semi-transmissive displays 220 may be separately provided.

Alternatively, the semi-transmissive display(s) 220 may be provided so as to be embedded in part of the lenses.

Further, the present embodiment is not limited to such a glasses type, and can be applied to a hat type and other arbitrary head-mounted display devices as long as the device can be attached to the body of a person and can be arranged within the field of view of the person.

(Communication System 300)

Next, the communication system 300 is described.

The communication system 300 includes a battery unit 301, an antenna module 302, a camera unit 303, a speaker unit 304, a global positioning system (GPS) unit 307, a microphone unit 308, a subscriber identity module card (SIM) unit 309, and a main unit 310.

Note that the camera unit may be provided with a CCD sensor. The speaker unit 304 may be normal earphones, and may be bone-conduction earphones. The SIM unit 309 includes a near field communication (NFC) unit, another contact-type IC card unit, and a contactless IC card unit.

As described above, the communication system 300 according to the present embodiment at least has any of the functions of a mobile phone, a smartphone, and a tablet terminal. Specifically, the communication system 300 has a phone function, an Internet function, a browser function, an e-mail function, an image taking function, and the like.

Accordingly, with the use of the glasses display device 100, the user can use a phone call function similar to that of a mobile phone by means of the communication device, the speaker, and the microphone. Moreover, because the glasses display device 100 is glasses-shaped, the user can make a phone call without using both his/her hands.

(Operation System 400)

Next, the operation system 400 includes an infrared ray detection unit 410, a gyroscope unit 420, an acceleration detection unit 430, and a control unit 450. The infrared ray detection unit 410 mainly includes an infrared ray emission element 411 and an infrared ray detection camera 412.

Figure 3:
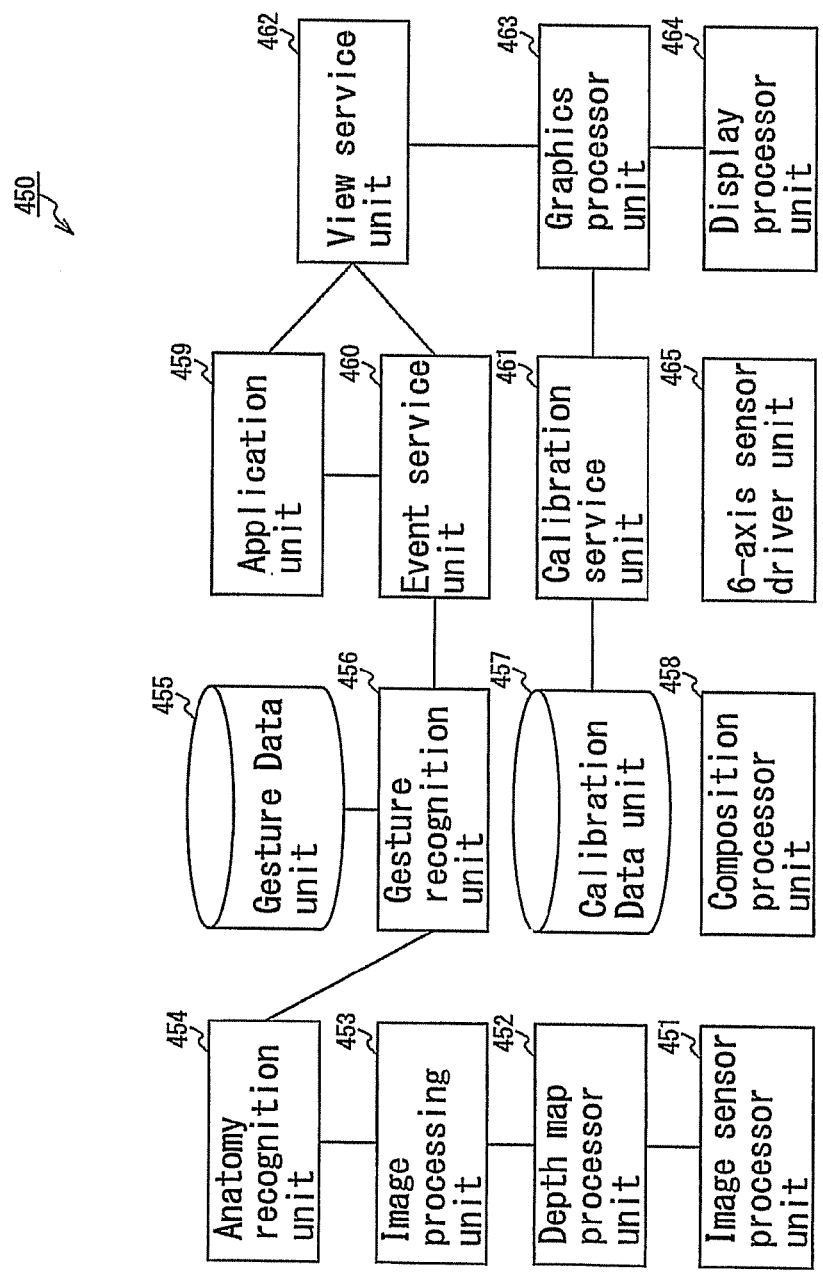
FIG. 3 is a schematic diagram illustrating an example of a configuration of a control unit 450 of an operation system 400.

Next, a configuration, a processing flow, and a concept of the operation system 400 are described. FIG. 3 is a schematic diagram illustrating an example of a configuration of the control unit 450 of the operation system 400.

As illustrated in FIG. 3, the control unit 450 includes an image sensor processor unit 451, a depth map processor unit 452, an image processing unit 453, an anatomy recognition unit 454, a gesture data unit 455, a gesture recognition unit 456, a calibration data unit 457, a composition processor unit 458, an application unit 459, an event service unit 460, a calibration service unit 461, a view service unit 462, a graphics processor unit 463, a display processor unit 464, and a 6-axis sensor driver unit 465.

Note that the control unit 450 does not need to include all the above-mentioned units, and may include one or more necessary units as appropriate. For example, the gesture data unit 455 and the calibration data unit 457 may be arranged on a cloud service, and the composition processor unit 458 may not be particularly provided.

Figure 4:
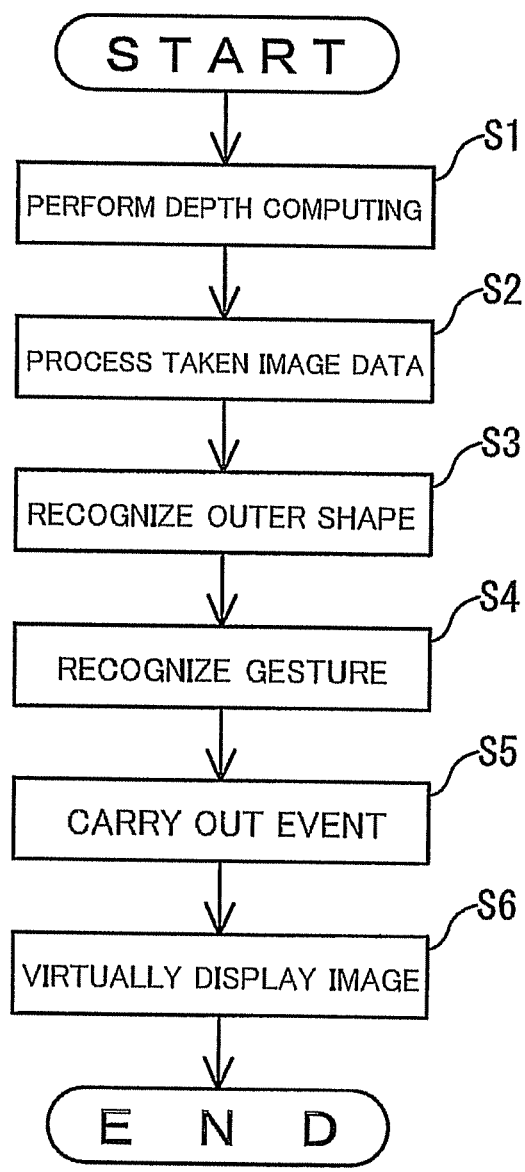
FIG. 4 is a flowchart illustrating a processing flow in the operation system 400.
Figure 5:
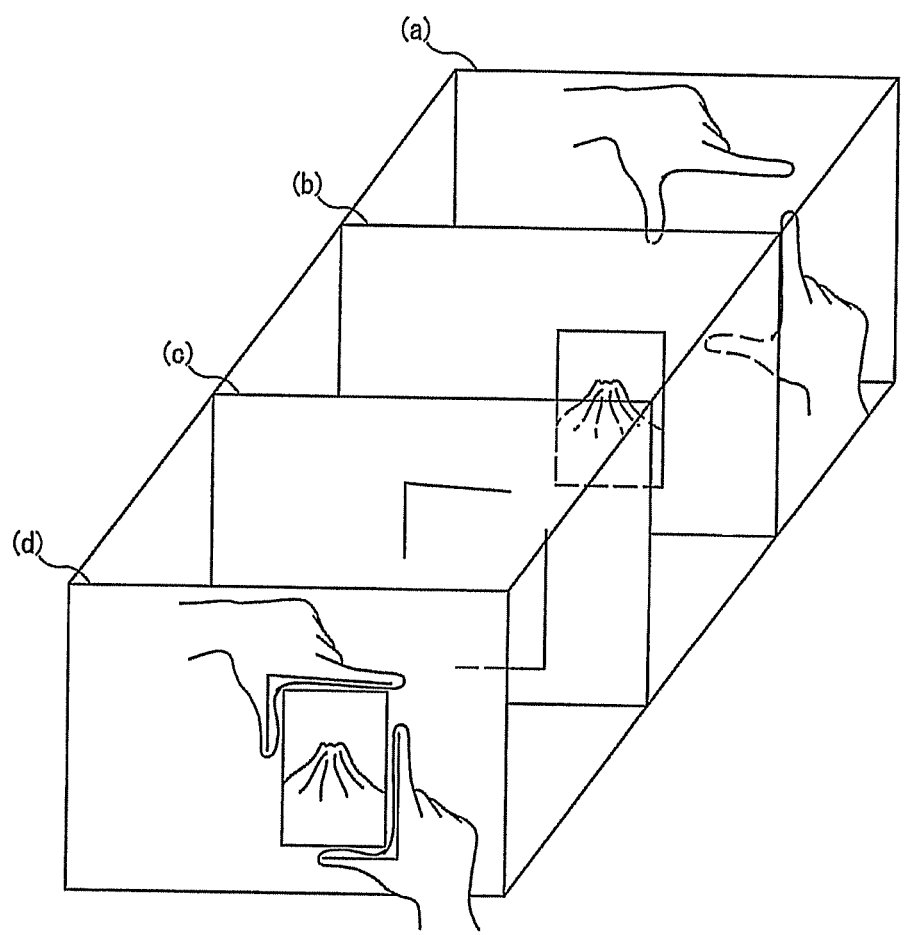
FIG. 5 is a schematic diagram illustrating a concept corresponding to the flowchart of FIG. 4.

Next, FIG. 4 is a flowchart illustrating a processing flow in the operation system 400, and FIG. 5 is a schematic diagram illustrating a concept according to the flowchart of FIG. 4.

First, as illustrated in FIG. 4, target data is acquired from the infrared ray detection unit 410, and depth computing is performed by the depth map processor unit 452 (Step S1). Then, outer shape image data is processed by the image processing unit 453 (Step S2).

Subsequently, on the basis of the structure of a standard human body, an anatomic feature is recognized from the outer shape image data processed in Step S2, by the anatomy recognition unit 454. As a result, an outer shape is recognized (Step S3).

Further, on the basis of the anatomic feature obtained in Step S3, a gesture is recognized by the gesture recognition unit 456 (Step S4).

The gesture recognition unit 456 refers to gesture data recorded in the gesture data unit 455, and recognizes the gesture from the outer shape whose anatomic feature has been recognized. Note that, although it is assumed that the gesture recognition unit 456 refers to the gesture data recorded in the gesture data unit 455, not limited thereto, the gesture recognition unit 456 may refer to other arbitrary data, and may perform processing without any reference.

In such a manner as described above, a gesture of hands is recognized as illustrated in FIG. 5(a).

Subsequently, the application unit 459 and the event service unit 460 carry out a predetermined event in accordance with the gesture recognized by the gesture recognition unit 456 (Step S5).

As a result, as illustrated in FIG. 5(b), for example, an image is displayed by a picture application. On this occasion, taken image data from the camera unit 303 may be displayed on this screen.

Lastly, the view service unit 462, the calibration service unit 461, the graphics processor unit 463, the display processor unit 464, and the composition processor unit 458 display or virtually display an image on the semi-transmissive displays 220 (Step S6). As a result, skeletons of the hands indicating the gesture are displayed as illustrated in FIG. 5(c), and a composite image that is formed such that the shape and size of a picture coincide with the shape and size of the skeletons is displayed as illustrated in FIG. 5(d).

Note that the 6-axis sensor driver unit 465 always detects signals from the gyroscope unit 420 and the acceleration detection unit 430, and transmits a posture condition to the display processor unit 464.

In the case where the user to whom the glasses display device 100 is attached inclines the glasses display device 100, the 6-axis sensor driver unit 465 always receives signals from the gyroscope unit 420 and the acceleration detection unit 430, and controls image display. In this control, the displayed image may be kept horizontal, and may be adjusted in accordance with the inclination.

(One Example of Detection Region and Virtual Display Region)

Next, a relation between a detection region of the infrared ray detection unit 410 of the operation system 400 and a virtual display region of the pair of semi-transmissive displays 220 is described.

Figure 6:
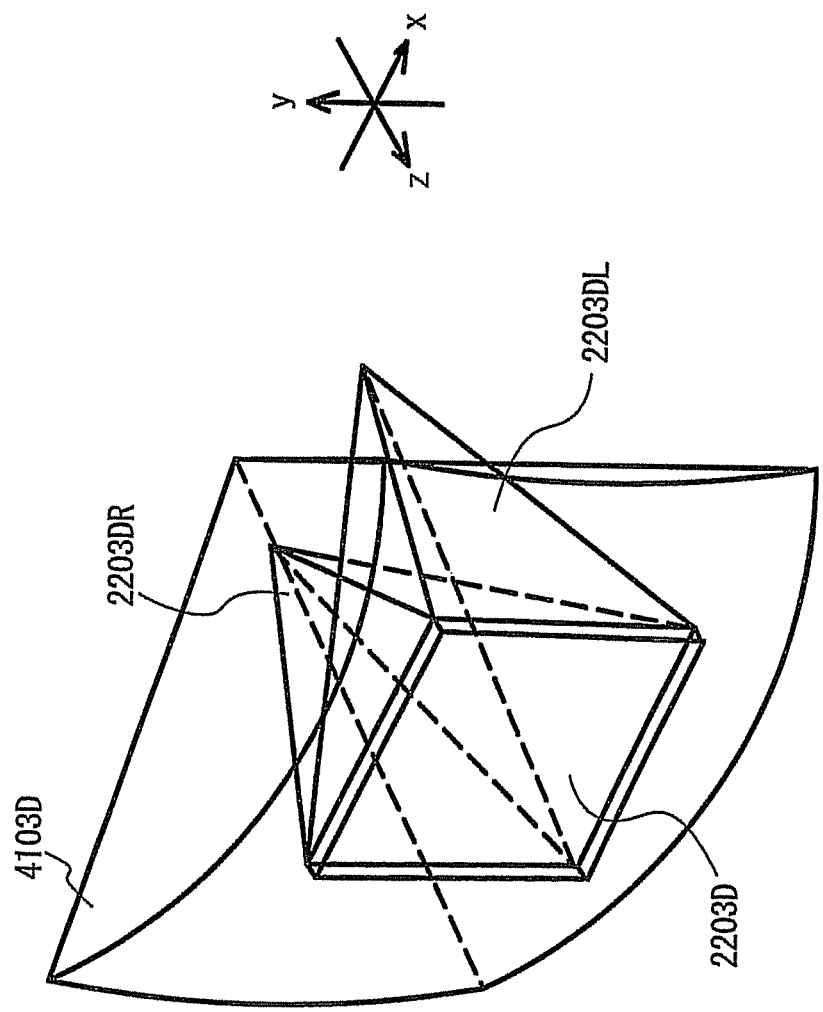
FIG. 6 is a schematic perspective view for describing a detection region of an infrared ray detection unit 410 and a virtual display region of a pair of semi-transmissive displays 220.
Figure 7:
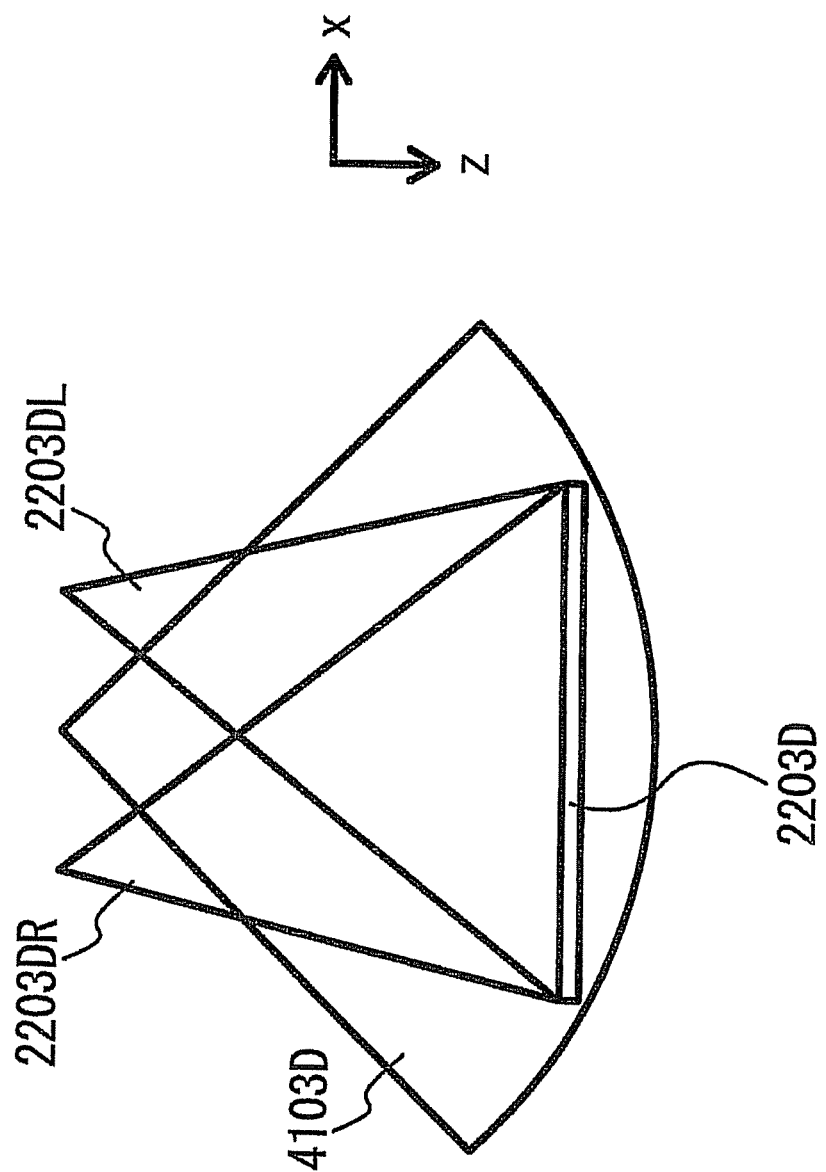
FIG. 7 is a top view of FIG. 6.
Figure 8:
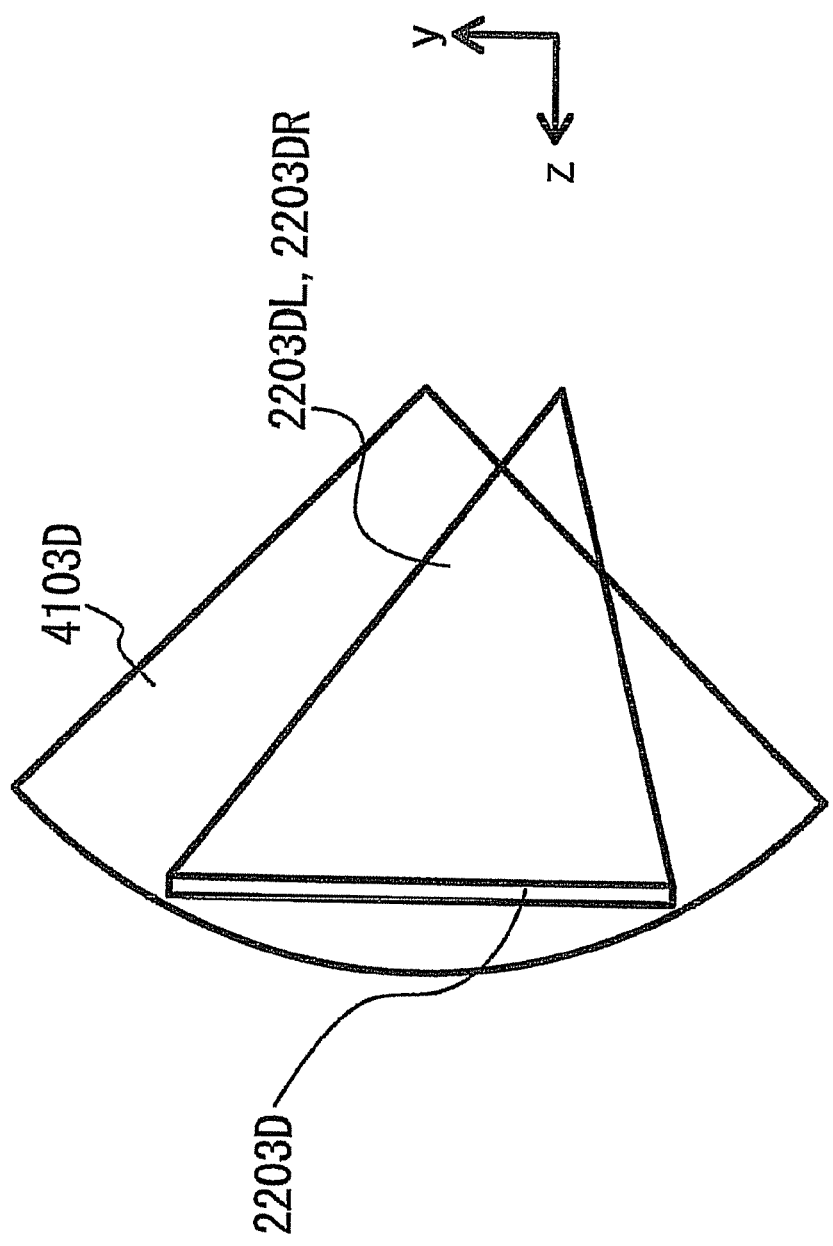
FIG. 8 is a side view of FIG. 6.

FIG. 6 is a schematic perspective view for describing the detection region of the infrared ray detection unit 410 and the virtual display region of the pair of semi-transmissive displays 220, FIG. 7 is a top view of FIG. 6, and FIG. 8 is a side view of FIG. 6.

In the following, for convenience of description, a three-dimensional orthogonal coordinate system formed by an x-axis, a y-axis, and a z-axis is defined as illustrated in FIG. 6. In the following drawings, an x-axis arrow indicates the horizontal direction. A y-axis arrow indicates the vertical direction or the long axis direction of the user's body. A z-axis arrow indicates the depth level direction. The z-axis positive direction indicates the direction of a higher depth level. The direction of each arrow is the same in the other drawings.

As illustrated in FIG. 6 to FIG. 8, a three-dimensional space detection region (3D space) 4103D in which detection by the infrared ray detection unit 410 of the operation system 400 is possible is provided.

The three-dimensional space detection region 4103D is formed by a conical or pyramidal three-dimensional space extending from the infrared ray detection unit 410.

That is, infrared rays emitted from the infrared ray emission element 411 can be detected by the infrared ray detection camera 412, and hence the infrared ray detection unit 410 can recognize a gesture in the three-dimensional space detection region 4103D.

Moreover, although one infrared ray detection unit 410 is provided in the present embodiment, not limited thereto, a plurality of the infrared ray detection units 410 may be provided, and one infrared ray emission element 411 and a plurality of the infrared ray detection cameras 412 may be provided.

Subsequently, as illustrated in FIG. 6 to FIG. 8, the pair of semi-transmissive displays 220 is visually recognized by the user as a virtual display with a depth in not an actual place of the glasses display device 100 but a virtual image display region 2203D that is a place apart from the glasses display device 100. The depth corresponds to the thickness in the depth level direction (z-axis direction) of a virtual stereoscopic shape of the virtual image display region 2203D. Accordingly, the depth is provided in accordance with the thickness in the depth level direction (z-axis direction) of the virtual stereoscopic shape.

That is, although images are respectively displayed on the semi-transmissive displays 220 of the glasses display device 100 in actuality, a right-eye image is transmitted through the semi-transmissive display 220 on the right-eye side to be recognized by the user in a three-dimensional space region 2203DR, and a left-eye image is transmitted through the semi-transmissive display 220 on the left-eye side to be recognized by the user in a three-dimensional space region 2203DL. As a result, the two recognized images are composited with each other in the brain of the user, whereby the user can recognize the two images as a virtual image in the virtual image display region 2203D.

Moreover, the virtual image display region 2203D is displayed using any of a frame sequential method, a polarization method, a linear polarization method, a circular polarization method, a top-and-bottom method, a side-by-side method, an anaglyph method, a lenticular method, a parallax barrier method, a liquid crystal parallax barrier method, a two-parallax method, and a multi-parallax method using three or more parallaxes.

Moreover, in the present embodiment, the virtual image display region 2203D includes a space region common to the three-dimensional space detection region 4103D. In particular, as illustrated in FIG. 6 and FIG. 7, the virtual image display region 2203D exists inside of the three-dimensional space detection region 4103D, and hence the virtual image display region 2203D corresponds to the common region.

Note that the shape and size of the virtual image display region 2203D can be arbitrarily adjusted by a display method on the pair of semi-transmissive displays 220.

Moreover, as illustrated in FIG. 8, description is given above of the case where the infrared ray detection unit 410 is arranged above (y-axis positive direction) the pair of semi-transmissive displays 220. Even if the arrangement position in the vertical direction (y-axis direction), of the infrared ray detection unit 410 is below (y-axis negative direction) the semi-transmissive displays 220 or the same as the position of the semi-transmissive displays 220, the virtual image display region 2203D similarly includes a space region common to the three-dimensional space detection region 4103D.

(Other Examples of Detection Region and Virtual Display Region)

Figure 9:
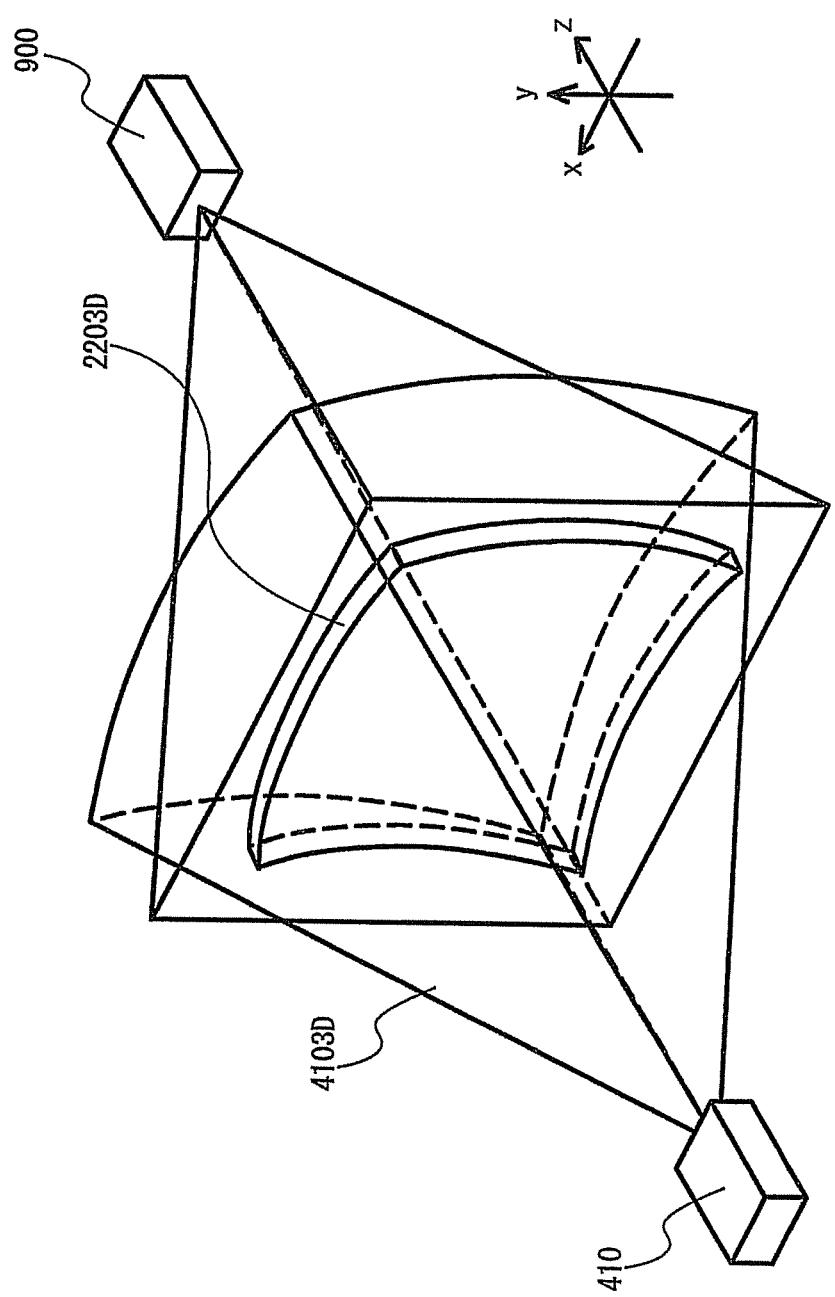
FIG. 9 is a schematic diagram illustrating another example of the detection region and the virtual display region.
Figure 10:
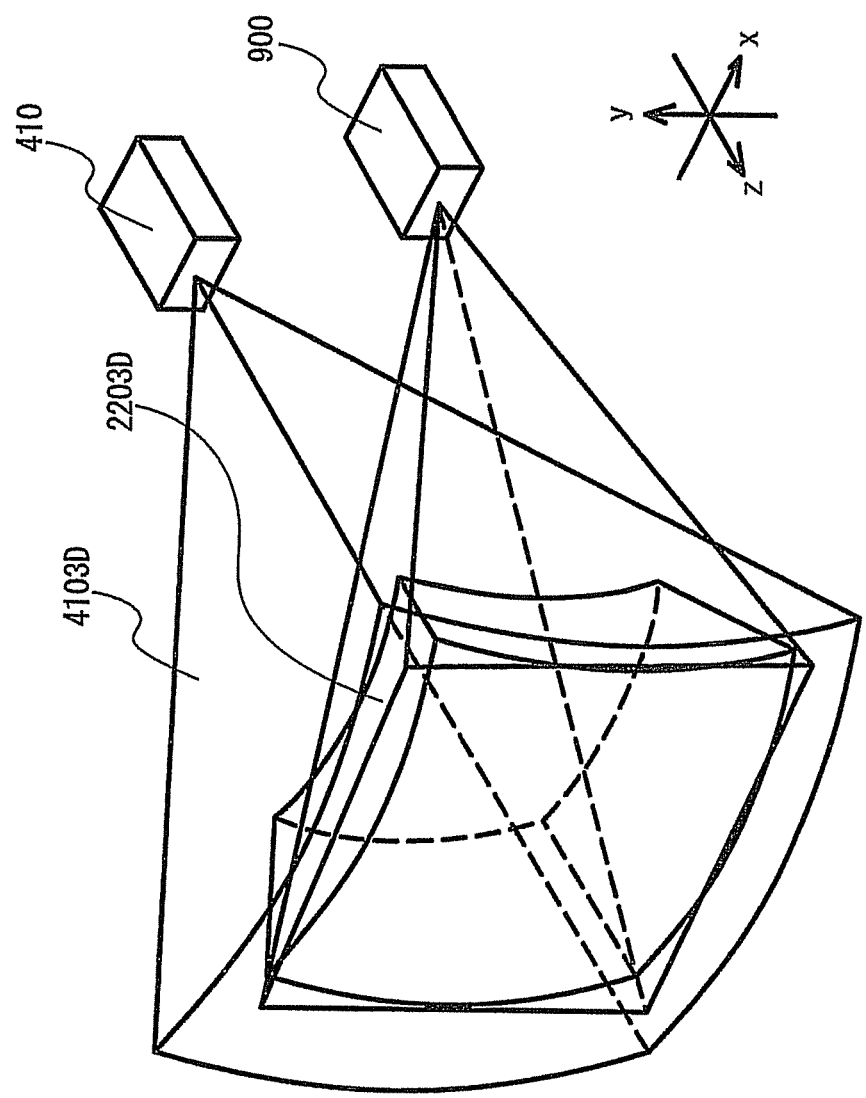
FIG. 10 is a schematic diagram illustrating another example of the detection region and the virtual display region.
Figure 11:
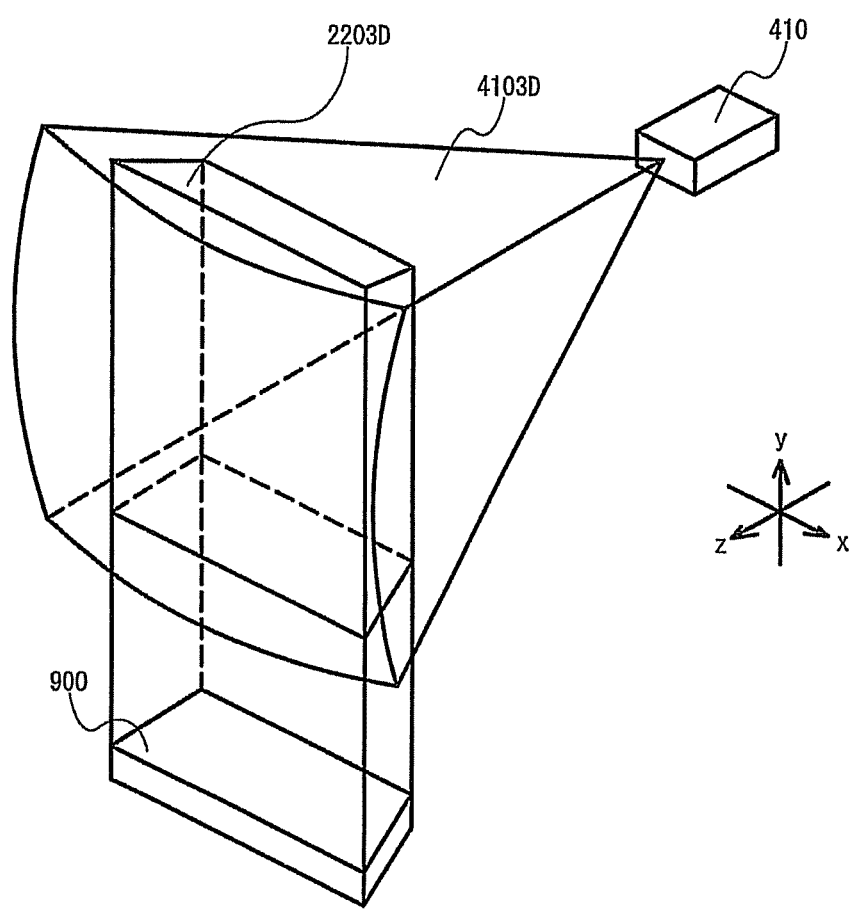
FIG. 11 is a schematic diagram illustrating another example of the detection region and the virtual display region.

Next, FIG. 9 to FIG. 11 are schematic diagrams respectively illustrating other examples of the detection region and the virtual display region illustrated in FIG. 6 to FIG. 8.

For example, as illustrated in FIG. 9 to FIG. 11, other I/O devices, display devices, televisions, monitors, and the like may be used instead of the semi-transmissive displays 220 of the glasses display device 100. Hereinafter, other I/O devices, display devices, televisions, monitors, and projectors are collectively referred to as an I/O device 900.

As illustrated in FIG. 9, the virtual image display region 2203D may be outputted in the z-axis negative direction from the I/O device 900, and the three-dimensional space detection region 4103D may be formed in the z-axis positive direction from the infrared ray detection unit 410 that is positioned so as to be opposed to the I/O device 900 in the z-axis direction.

In this case, the virtual image display region 2203D outputted by the I/O device 900 is generated as a space region common to the three-dimensional space detection region 4103D.

Moreover, as illustrated in FIG. 10, the virtual image display region 2203D may be outputted from the I/O device 900, and the three-dimensional space detection region 4103D of the infrared ray detection unit 410 may be formed in the same direction as that of the I/O device 900 (both in the z-axis positive direction with respect to the x-y plane).

Also in this case, the virtual image display region 2203D outputted by the I/O device 900 is generated as a space region common to the three-dimensional space detection region 4103D.

Then, as illustrated in FIG. 11; the virtual image display region 2203D may be outputted in the vertical upward direction (y-axis positive direction) from the I/O device 900. Also in FIG. 11, similarly to FIG. 9 and FIG. 10, the virtual image display region 2203D outputted by the I/O device 900 is generated as a space region common to the three-dimensional space detection region 4103D.

Moreover, although not illustrated, the I/O device 900 may be arranged on the upper side (y-axis positive direction side) of the three-dimensional space detection region 4103D, and the virtual image display region 2203D may be outputted in the vertical downward direction (y-axis negative direction). The virtual image display region 2203D may be outputted in the horizontal direction (x-axis direction). Like a projector or a movie theater, the virtual image display region 2203D may be outputted from the upper back side (the z-axis positive direction and the y-axis positive direction).

(Manipulation Region and Gesture Region)

Figure 12:
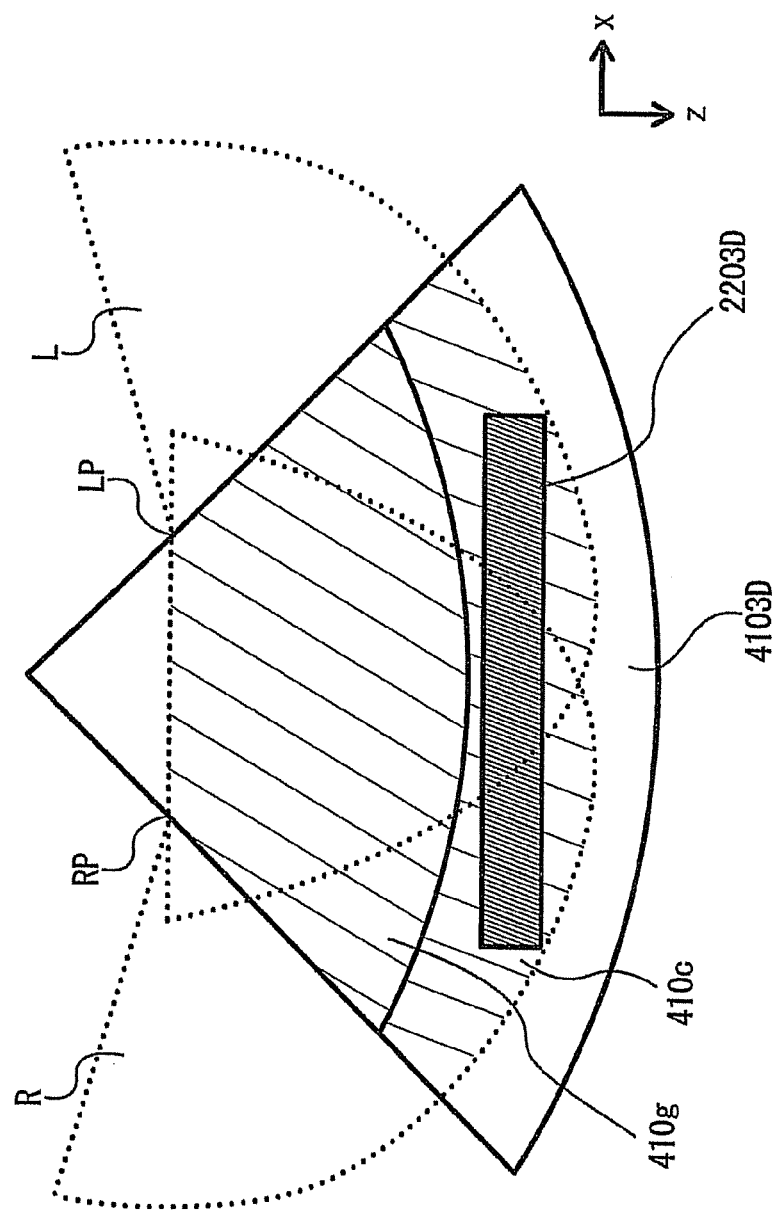
FIG. 12 is a schematic diagram illustrating an example of a manipulation region and a gesture region in the detection region.
Figure 13:
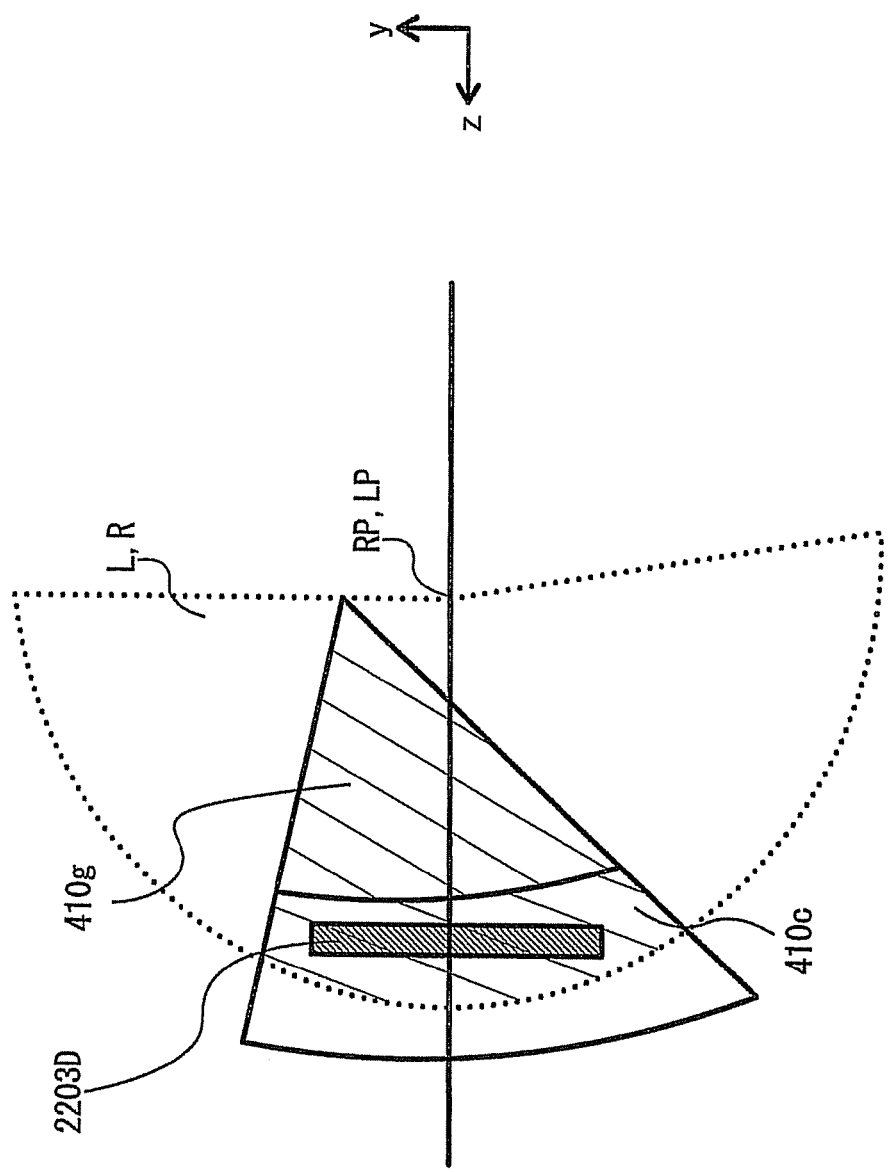
FIG. 13 is a schematic diagram illustrating an example of the manipulation region and the gesture region in the detection region.

Next, a manipulation region and a gesture region in the detection region are described. FIG. 12 and FIG. 13 are schematic diagrams illustrating an example of the manipulation region and the gesture region in the detection region.

First, as illustrated in FIG. 12, in general, the user horizontally moves both his/her hands about both his/her shoulder joints (a right shoulder joint RP and a left shoulder joint LP) as the respective centers of rotation, and hence both his/her hands can respectively move within a movement region L and a movement region R surrounded by dotted lines.

Moreover, as illustrated in FIG. 13, in general, the user vertically moves both his/her hands about both his/her shoulder joints (the right shoulder joint RP and the left shoulder joint LP) as the respective centers of rotation, and hence both his/her hands can respectively move within the movement region L and the movement region R surrounded by dotted lines.

That is, as illustrated in FIG. 12 and FIG. 13, the user can move both his/her hands about the right shoulder joint RP and the left shoulder joint LP as the respective centers of rotation, in a three-dimensional space having an imperfect spherical shape (having an arch-like curved surface that is convex in the depth level direction).

Then, an overlapping space region of all of: the three-dimensional space detection region 4103D of the infrared ray detection unit 410; a region in which a virtual image display region can exist (in FIG. 12, the virtual image display region 2203D is illustrated as an example); and a region obtained by integrating the arm movement region L and the arm movement region R is set as a manipulation region 410c.

Moreover, a portion other than the manipulation region 410c in the three-dimensional space detection region 4103D is set as a gesture region 410g, the portion overlapping with the region obtained by integrating the arm movement region L and the arm movement region R.

Here, the manipulation region 410c has a stereoscopic shape whose farthest surface in the depth level direction is an arch-like curved surface that is convex in the depth level direction (z-axis positive direction), whereas the virtual image display region 2203D has a stereoscopic shape whose farthest surface in the depth level direction is a planar surface. Due to such a difference in the shape of the farthest surface between the two regions, the user physically feels a sense of discomfort during the manipulation. In order to solve the sense of discomfort, adjustment is performed in a calibration process. Moreover, the details of the calibration process are described below.

(Description of Calibration)

Figure 14:
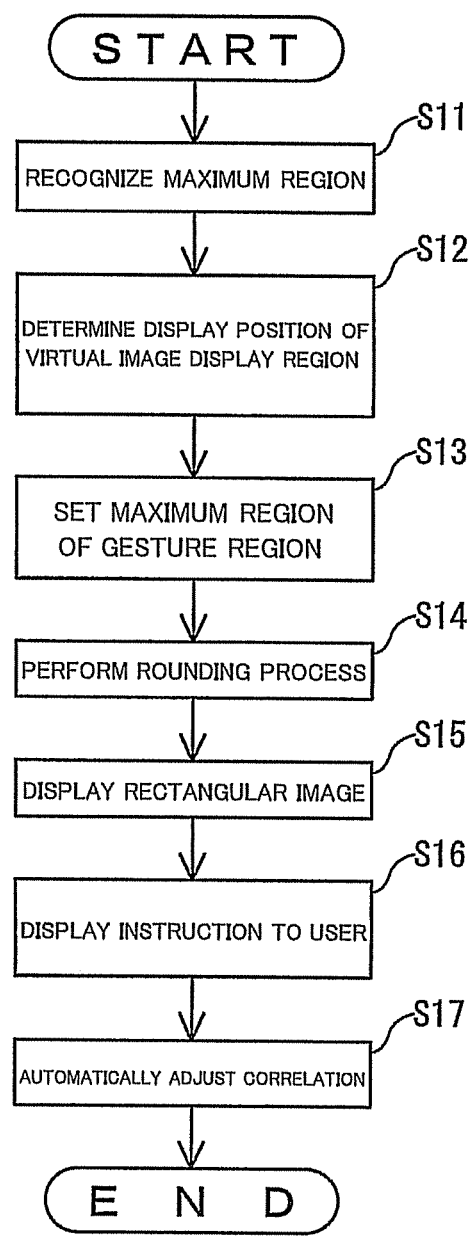
FIG. 14 is a flowchart for describing a calibration process.

Next, the calibration process is described. FIG. 14 is a flowchart for describing the calibration process.

As illustrated in FIG. 12 and FIG. 13, when the user tries to move his/her hand(s) along the virtual image display region 2203D, the user needs to move his/her hand(s) along a plane without any guide. Accordingly, the calibration process is performed to facilitate the manipulation in the virtual image display region 2203D through a reorganization process to be described below.

Moreover, in the calibration process, the finger length, the hand length, and the arm length, which are different for each user, are also adjusted.

Hereinafter, description is given with reference to FIG. 14. First, the glasses display device 100 is attached to the user, and the user maximally stretches both his/her arms. As a result, the infrared ray detection unit 410 recognizes the maximum region of the manipulation region 410c (Step S11).

That is, because the finger length, the hand length, and the arm length are different for each user, the manipulation region 410c is adjusted to suit each user.

Then, in the glasses display device 100, a display position of the virtual image display region 2203D is determined (Step S12). That is, if the virtual image display region 2203D is arranged outside of the manipulation region 410c, a user's manipulation becomes impossible, and hence the virtual image display region 2203D is arranged inside of the manipulation region 410c.

Subsequently, the maximum region of the gesture region 410g is set within the three-dimensional space detection region 4103D of the infrared ray detection unit 410 of the glasses display device 100 so as not to overlap with the display position of the virtual image display region 2203D (Step S13).

Note that it is preferable that the gesture region 410g be arranged so as not to overlap with the virtual image display region 2203D and be provided with a thickness in the depth direction (z-axis positive direction).

In the present embodiment, the manipulation region 410c, the virtual image display region 2203D, and the gesture region 410g are set in such a manner as described above.

Next, calibration of the virtual image display region 2203D in the manipulation region 410c is described.

In the case where it is determined that the finger(s), the hand(s), or the arm(s) of the user exist around the outside of the virtual image display region 2203D in the manipulation region 410c, such rounding as if the finger(s), the hand(s), or the arm(s) of the user existed inside of the virtual image display region 2203D is performed (Step S14).

As illustrated in FIG. 12 and FIG. 13, in a region near a central part of an image virtually displayed by the semi-transmissive displays 220, if the user maximally stretches both his/her arms, the tips of both his/her hands do not stay within the virtual image display region 2203D and go out thereof in the depth direction (z-axis positive direction). Meanwhile, in an end part of the virtually displayed image, unless the user maximally stretches both his/her arms, it is not determined that the tips of both his/her hands exist within the virtual image display region 2203D.

Hence, if a signal from the infrared ray detection unit 410 is used without being processed, even if the tips of his/her hands go out of the virtual image display region 2203D, the user has difficulty in physically feeling such a state.

Accordingly, in the process of Step S14 in the present embodiment, the signal from the infrared ray detection unit 410 is processed such that the tips of his/her hands that protrude to the outside of the virtual image display region 2203D are corrected to exist within the virtual image display region 2203D.

As a result, in the state where the user maximally stretches or slightly bends both his/her arms, a manipulation from the central part to the end part in the planar virtual image display region 2203D with a depth is possible.

Note that, although the virtual image display region 2203D is formed by a three-dimensional space region whose farthest surface in the depth level direction is a planar surface in the present embodiment, not limited thereto, the virtual image display region 2203D may be formed by a three-dimensional space region that is a curved surface having a shape along the farthest surfaces in the depth level direction of the farthest surface regions L and R in the depth level direction. As a result, in the state where the user maximally stretches or slightly bends both his/her arms, a manipulation from the central part to the end part in the planar virtual image display region 2203D with a depth is possible.

Further, the semi-transmissive displays 220 display a rectangular image in the virtual image display region 2203D. For example, as illustrated in FIG. 5(b), the semi-transmissive displays 220 display a rectangular image (Step S15).

Subsequently, an instruction to the effect that "please surround the displayed image with your fingers" is displayed on the semi-transmissive displays 220 (Step S16). Here, a finger-shaped image may be softly displayed in the vicinity of the image, and a vocal instruction from the speaker may be given to the user instead of such display on the semi-transmissive displays 220.

According to the instruction, the user places his/her fingers on a portion of the image as illustrated in FIG. 5(d). Then, a correlation between the display region of the virtual image display region 2203D and the infrared ray detection unit 410 is automatically adjusted (Step S17).

Note that, in the above example, the user defines a rectangular with his/her fingers, and places the rectangular thus defined on the rectangular of the outer edge of the image. For this reason, the visual recognition size and position of the rectangular defined by his/her fingers is made coincident with the visual recognition size and position of the rectangular of the outer edge of the image. However, the method of defining a shape with fingers is not limited thereto, and may be other arbitrary methods such as a method of tracing the outer edge of the displayed image with a finger and a method of pointing to a plurality of points on the outer edge of the displayed image with a finger. Moreover, these methods may be applied to images having a plurality of sizes.

Note that, although only the case of the glasses display device 100 is taken in the above description of the calibration process, in the case of the I/O device 900, an image may be displayed in the process of Step S11, and a correlation between the displayed image and the infrared ray detection unit 410 may be adjusted in the process of Step S17.

(Finger, Palm, and Arm Recognition)

Figure 15:
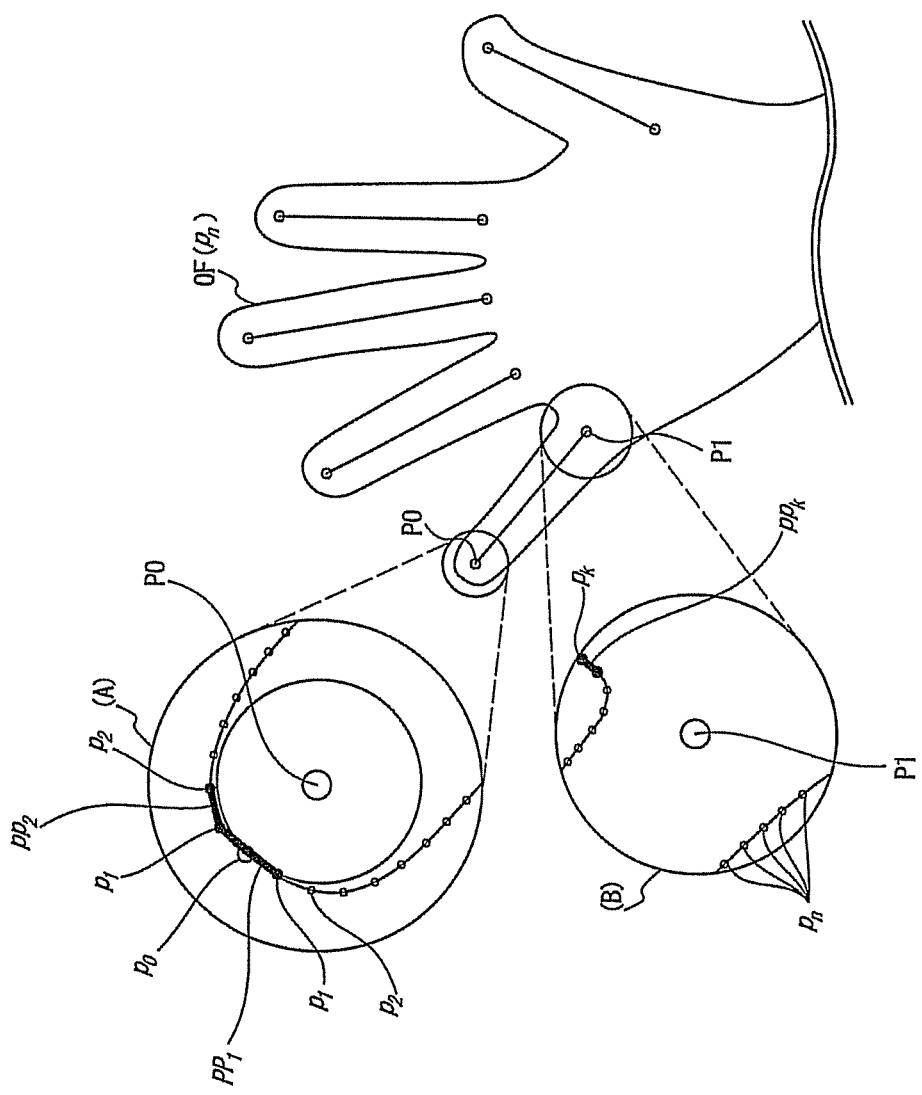
FIG. 15 is a schematic diagram illustrating an example of finger recognition.
Figure 16:
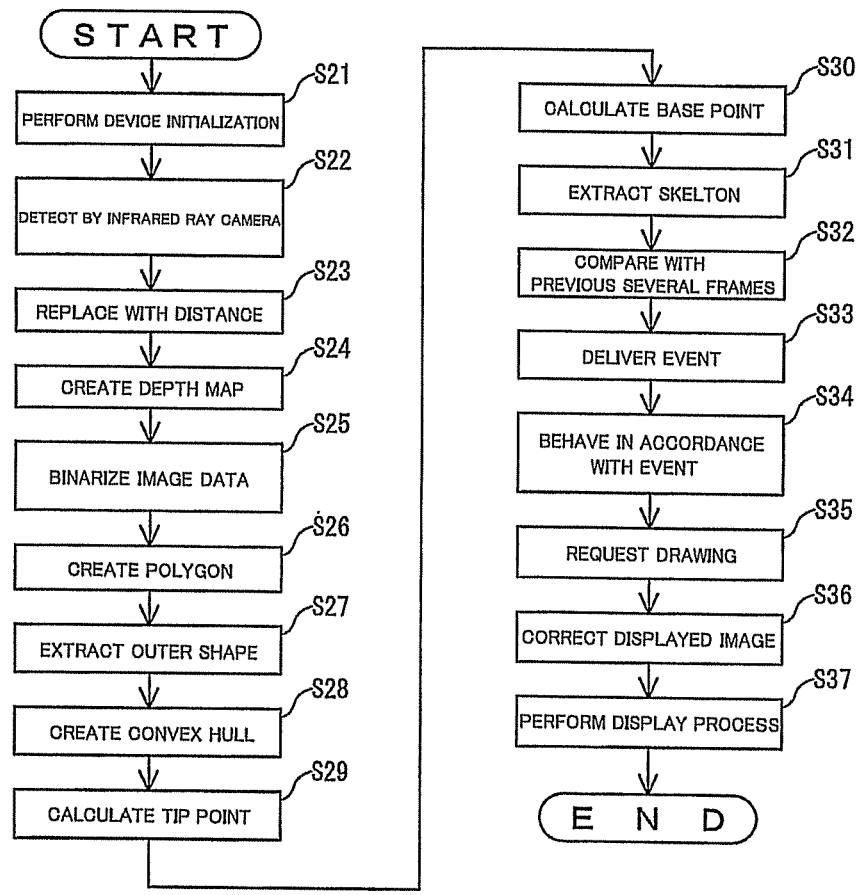
FIG. 16 is a flowchart illustrating an example of a finger recognition process.

Next, finger recognition is described, followed by description of palm recognition and arm recognition in the stated order. FIG. 15 is a schematic diagram illustrating an example of the finger recognition. In FIG. 15, (A) is an enlarged view of the vicinity of the tip of a finger, and (B) is an enlarged view of the vicinity of the base of the finger. FIG. 16 is a flowchart illustrating an example of the finger recognition process.

As illustrated in FIG. 16, in the present embodiment, device initialization is performed (Step S21). Then, an infrared ray that has been emitted from the infrared ray emission element 411 and has been reflected on a hand is detected by the infrared ray detection camera 412 (Step S22).

Then, image data is replaced with a distance on a pixel basis by the infrared ray detection unit 410 (Step S23). In this case, the luminance of the infrared ray is inversely proportional to the cube of the distance. A depth map is created using this fact (Step S24).

Subsequently, an appropriate threshold is set to the created depth map. Then, the image data is binarized (Step S25). That is, noise is removed from the depth map.

Subsequently, a polygon having about 100 vertexes is created from the binarized image data (Step S26). Then, a new polygon having a larger number of vertexes $p_n$ is created using a low-pass filter (LPF) such that the vertexes become smoother, whereby an outer shape OF of the hand illustrated in FIG. 15 is extracted (Step S27).

Note that, although the number of vertexes that are extracted from the data binarized in Step S26 in order to create a polygon is about 100 in the present embodiment, not limited thereto, the number of vertexes may be 1,000 or other arbitrary numbers.

(Finger Recognition)

A convex hull is extracted using Convex Hull from the set of the vertexes $p_n$ of the new polygon created in Step S27 (Step S28).

After that, a vertex $p_0$ common between the new polygon created in Step S27 and the convex hull created in Step S28 is extracted (Step S29). The common vertex $p_0$ itself thus extracted can be used as a tip point of the finger.

Further, another point calculated on the basis of the position of the vertex $p_0$ may be used as the tip point of the finger. For example, as illustrated in FIG. 15(A), the center of an inscribed circle of the outer shape OF at the vertex $p_0$ may also be calculated as a tip point P0.

Then, as illustrated in FIG. 15, a vector of a reference line segment $PP_1$ that passes through a pair of right and left vertexes $p_1$ adjacent to the vertex $p_0$ is calculated. After that, a side $pp_2$ connecting each vertex $p_1$ and a vertex $p_2$ adjacent thereto is selected, and a vector of the side $pp_2$ is calculated. Similarly, with the use of the vertexes $p_n$ forming the outer shape OF, such a process of obtaining a vector of each side is repeated along the outer periphery of the outer shape OF. The direction of each side and the direction of the reference line segment $PP_1$ calculated in the process of Step S30 are compared with each other, and a side $pp_k$ that is close to parallel to the reference line segment $PP_1$ is determined to exist at the position of a valley between fingers. Then, a base point P1 of the finger is calculated on the basis of the position of the side $pp_k$ (Step S30). A skeleton of the finger can be obtained by connecting the tip point P0 of the finger and the base point P1 of the finger using a straight line (Step S31). If the skeleton of the finger are obtained, the extending direction of the finger can be recognized.

A similar process is performed on all the fingers, whereby the skeletons of all the fingers are obtained. As a result, the pose of the hand can be recognized. That is, it can be recognized which of the thumb, the index finger, the middle finger, the ring finger, and the little finger is stretched and which thereof is bent.

Subsequently, a difference in the pose of the hand is detected in comparison with image data of several frames taken immediately before (Step S32). That is, movement of the hand can be recognized through the comparison with the image data of the several frames taken immediately before.

Subsequently, the recognized shape of the hand is event-delivered as gesture data to the event service unit 460 (Step S33).

Subsequently, a behavior according to the event is carried out by the application unit 459 (Step S34).

Subsequently, drawing in a three-dimensional space is requested by the view service unit 462 (Step S35).

The graphics processor unit 463 refers to the calibration data unit 457 using the calibration service unit 461, and corrects the displayed image (Step S36).

Lastly, the resultant image is displayed on the semi-transmissive displays 220 by the display processor unit 464 (Step S37).

Note that, although the base point of each finger is detected through the process of Step S30 and the process of Step S31 in the present embodiment, the method of detecting the base point is not limited thereto. For example, first, the length of the reference line segment $PP_1$ is calculated, the reference line segment $PP_1$ connecting the pair of vertexes $p_1$ that are adjacent to the vertex $p_0$ on one side and another side of the vertex $p_0$, respectively. Then, the length of a line segment connecting the pair of vertexes $p_2$ on the one side and the another side is calculated. Similarly, the length of each line segment connecting a pair of vertexes on the one side and the another side is calculated in order from vertexes positioned closer to the vertex $p_0$ to vertexes positioned farther therefrom. Such line segments do not intersect with one another inside of the outer shape OF, and are substantially parallel to one another. In the case where the vertexes at both the ends of such a line segment are in the portion of the finger, the length of the line segment corresponds to the width of the finger, and hence the amount of change thereof is small. Meanwhile, in the case where at least any of the vertexes at both the ends of such a line segment reaches the portion of the valley between the fingers, the amount of change of the length becomes larger. Accordingly, a line segment that has the length whose amount of change does not exceed a predetermined amount and is the farthest from the vertex $p_0$ is detected, and one point on the detected line segment is extracted, whereby the base point can be determined.

(Palm Recognition)

Figure 17:
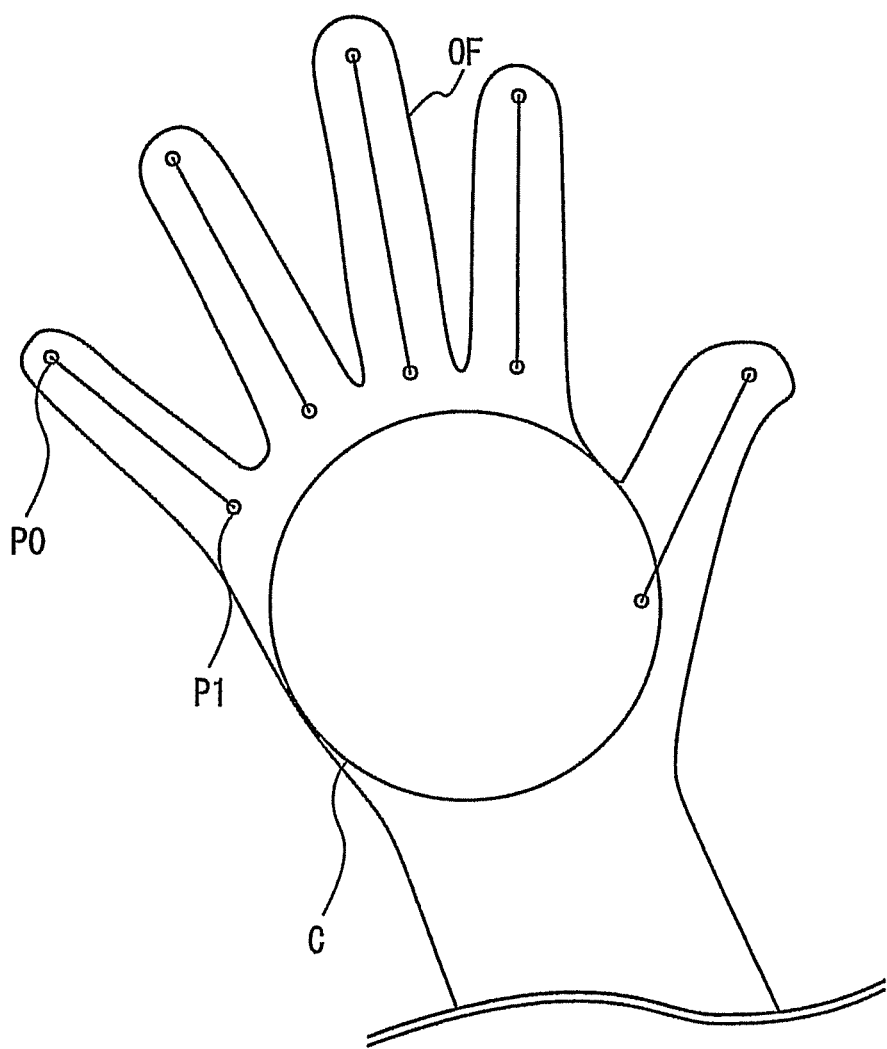
FIG. 17 is a schematic diagram illustrating an example of palm recognition.

Next, FIG. 17 is a schematic diagram illustrating an example of the palm recognition.

As illustrated in FIG. 17, after the finger recognition is carried out, a maximum inscribed circle C inscribed in the outer shape OF of the image data is extracted. The position of the maximum inscribed circle C can be recognized as the position of the palm.

Figure 18:
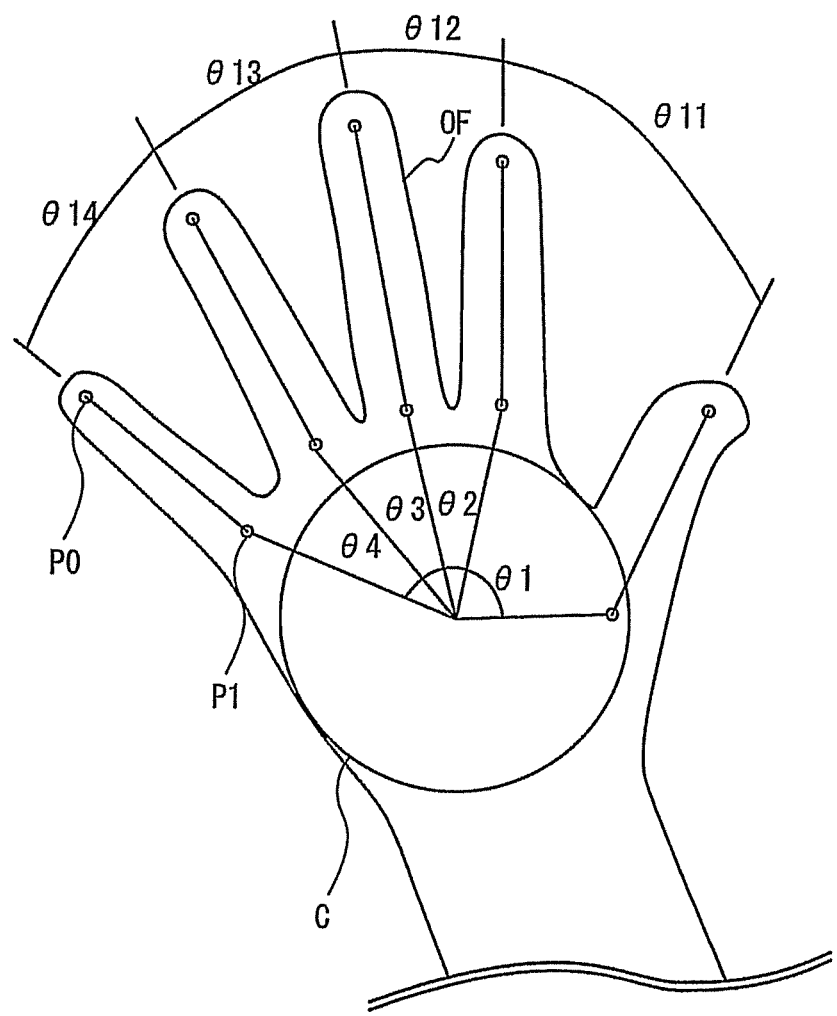
FIG. 18 is a schematic diagram illustrating an example of thumb recognition.

Next, FIG. 18 is a schematic diagram illustrating an example of thumb recognition.

As illustrated in FIG. 18, the thumb has features different from those of the other four fingers of the index finger, the middle finger, the ring finger, and the little finger. For example, among angles $\theta 1$, $\theta 2$, $\theta 3$, and $\theta 4$ mutually formed by straight lines connecting: the center of the maximum inscribed circle C indicating the position of the palm; and the respective base points P1 of the fingers, $\theta 1$ concerning the thumb tends to be the largest. Moreover, among angles $\theta 11$, $\theta 12$, $\theta 13$, and $\theta 14$ mutually formed by straight lines connecting: the respective tip points P0 of the fingers; and the respective base points P1 of the fingers, $\theta 11$ concerning the thumb tends to be the largest. The thumb is determined on the basis of such tendencies. As a result, it can be determined whether the image data is a right hand or a left hand or whether the image data is the front side or the back side of the palm.

(Arm Recognition)

Next, the arm recognition is described. In the present embodiment, the arm recognition is carried out after any of the fingers, the palm, and the thumb is recognized. Note that the arm recognition may also be carried out before any of the fingers, the palm, and the thumb is recognized or at the same time as at least any thereof is recognized.

In the present embodiment, a polygon is extracted from a region larger than the polygon of the shape of the hand of the image data. For example, the processes of Steps S21 to S27 are carried out in a length range of 5 cm or more and 100 cm or less and, more preferably, a length range of 10 cm or more and 40 cm or less, so that an outer shape is extracted.

After that, a quadrangular frame circumscribed around the extracted outer shape is selected. In the present embodiment, the shape of the quadrangular frame is a parallelogram or a rectangle.

In this case, because the parallelogram or the rectangle has longer sides opposed to each other, the extending direction of the arm can be recognized from the extending direction of the longer sides, and the direction of the arm can be determined from the direction of the longer sides. Note that, similarly to the process of Step S32, movement of the arm may be detected in comparison with image data of several frames taken immediately before.

Note that, although the fingers, the palm, the thumb, and the arm are detected from a two-dimensional image in the above description, not limited thereto, the infrared ray detection unit 410 may be further provided, or only the infrared ray detection camera 412 may be further provided, and a three-dimensional image may be recognized from two-dimensional images. As a result, the recognition accuracy can be further enhanced.

(Registration of Gesture)

Gesture data to be stocked in the gesture data unit 455 (see FIG. 3) is registered by a user. The gesture data is set as a gesture command by the user, and is further rewritten as needed.

(Registration of Gesture Data)

Figure 19:
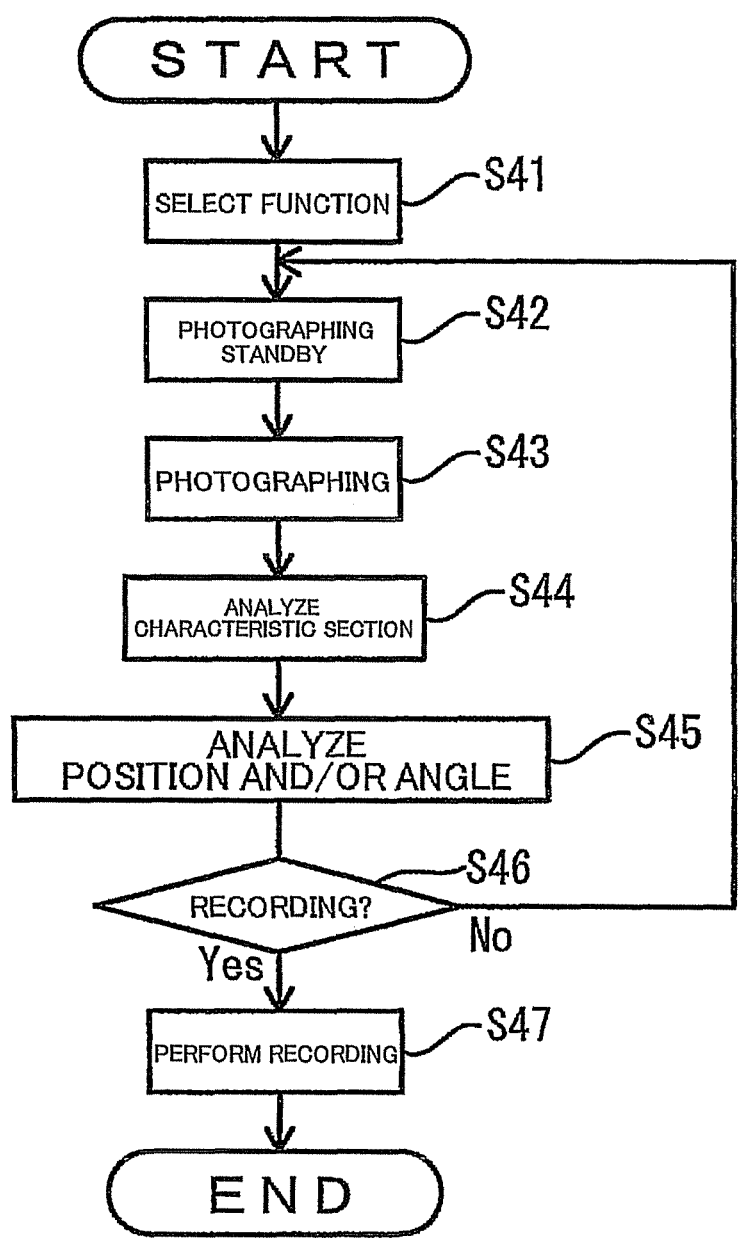
FIG. 19 is a flowchart illustrating an example of a registration process of gesture data.

FIG. 19 is a flowchart illustrating an example of a process of registering gesture data in the gesture data unit 455.

In the present embodiment, in accordance with a user's operation, the application unit 459 activates a gesture setting application. As illustrated in FIG. 19, a gesture-data registration function is selected from functions displayed on the application screen (step S41). Thereby, preparation for photographing is started. In the preparation for photographing, the user expresses a form that is desired to be registered as a gesture by using a hand and an arm. Until the form of the hand expressing the gesture is decided by the user, the photographing is on standby (step S42). For example, a photographing standby time may be set to five seconds.

Thereafter, part including the hand expressing the gesture and at least part of the arm is photographed (step S43). By the photographing, external-shape data as the detected serial external shape is obtained. To obtain data of the external shape, a moving image is obtained by photographing the hand and the arm expressing the gesture for a predetermined time. For example, a photographing time may be set to ten seconds.

During the photographing time, when a gesture includes an operation, a state of repeating the operation of the gesture can be photographed.

When a gesture is a gesture not intending the transition of the operation, a state of moving the hand and the arm in different ways can be photographed in such a way that the gesture does not depart from forms which the user himself/herself is conscious of as the gesture, while a sign of the gesture is shown.

In addition to the above moving-image photographing, external-shape data may be obtained as a plurality of detected external shapes by photographing a still-image a plurality of times. In this case, when a gesture includes an operation, a plurality of frames can be obtained by performing continuous photographing while the gesture is expressed. When a gesture does not include an operation, a plurality of frames can be obtained by changing the time and the place to photograph the identical gesture.

The photographing is performed by the infrared ray detection unit 410, for example. When photographing, the infrared ray detection unit 410 detects the external shapes of a hand and an arm expressing a gesture. The external-shape detection is performed by a process same as that in step S22 to step S25 in FIG. 16. The process of the external-shape detection is performed for each of the plurality of frames.

Based on the photographing result, a feature part of the hand and the arm expressing the gesture is analyzed (step S44). The feature part of each of a plurality of the detected external shapes is analyzed. Examples of the feature part to be analyzed include part of the object that indicates anatomic feature such as the number and the position of the fingers having a predetermined form.

The position and/or the value of an angle of the feature part are analyzed (step S45). The position of the feature part can be expressed by adding the coordinate information of the anatomic feature points of an object such as points indicating a fingertip and a base of the finger. The angle of the feature part can be expressed by adding the angle information based on the extending direction of the finger, the extending direction of the arm, and the like.

In step S44 and step S45, a process same as the above finger recognition, palm recognition, and arm recognition is performed.

More specifically, a process same as that in steps S26 to S31 in FIG. 16 is performed. Thereby, a similar process is performed for every finger so that skeletons of all of the fingers are obtained. Accordingly, the extending direction of the finger, which is more specifically an angle of the finger around the finger joint, can be recognized. The positions of the feature points indicating the fingertip and the base of the finger can be recognized by adding the coordinate information. In addition, the form of the hand can be recognized. For example, the form of each finger (more specifically, for example, which finger of a thumb, an index finger, a middle finger, a ring finger and a little finger is folded and which finger is extended) can be recognized.

As in FIG. 17, the position of a palm can be recognized by palm recognition. As in FIG. 18, whether a right hand or a left hand is or whether the front side or the back side of the palm is can be determined by thumb recognition. Thereby the position of a predetermined finger can be recognized.

The extending direction of an arm, which is more specifically an angle of the arm around an elbow joint, can be determined.

In step S45, furthermore, the information on the above feature parts extracted for the plurality of external shapes are integrated so that even the movable ranges of the hand and the arm expressing the gesture which is a photographing target in step S43 is derived.

More specifically, a range including a maximum value and a minimum value of the angle obtained by the above extracting of the feature parts is obtained so that the movable range can be derived.

Alternatively, a range including a coordinate locus of a feature part indicating a fingertip or the like is obtained so that the movable range can be derived.

When a gesture includes an operation, a plurality of external shapes are temporally compared with one another based on the difference in each feature part extracted in the plurality of external shapes. Accordingly, the transition of the external shape involved by the gesture operation can be also recognized.

The user determines whether the above analysis result is recorded as gesture data (step S46). In this case, the photographed form of the hand and the arm may be confirmed by replaying the photographed moving image and displaying the analysis result. When the analysis result is recorded as gesture data (Yes at step S46), the analysis result is recorded in the gesture data unit 455 (step S47). When the analysis result is not recorded as gesture data (No at step S46), photographing standby (step S42) can be performed again to photograph another moving image, without recording the analysis result in the gesture data unit 455.

In the above embodiment, an aspect in which the serial external shape or the plurality of the external shapes are obtained has been described. However, the present invention is not limited to this aspect. For example, it is possible that one external shape is obtained, the feature point and a value of the position and/or the direction of the obtained external shape are analyzed, and thus, the analysis result is recorded in the gesture data unit 455. In this case, a predetermined range is obtained by adding a predetermined width to the obtained values so that the predetermined range can be recorded in the gesture data unit 455 as a range of allowable gestures.

(Setting of Gesture Command)

Figure 20:
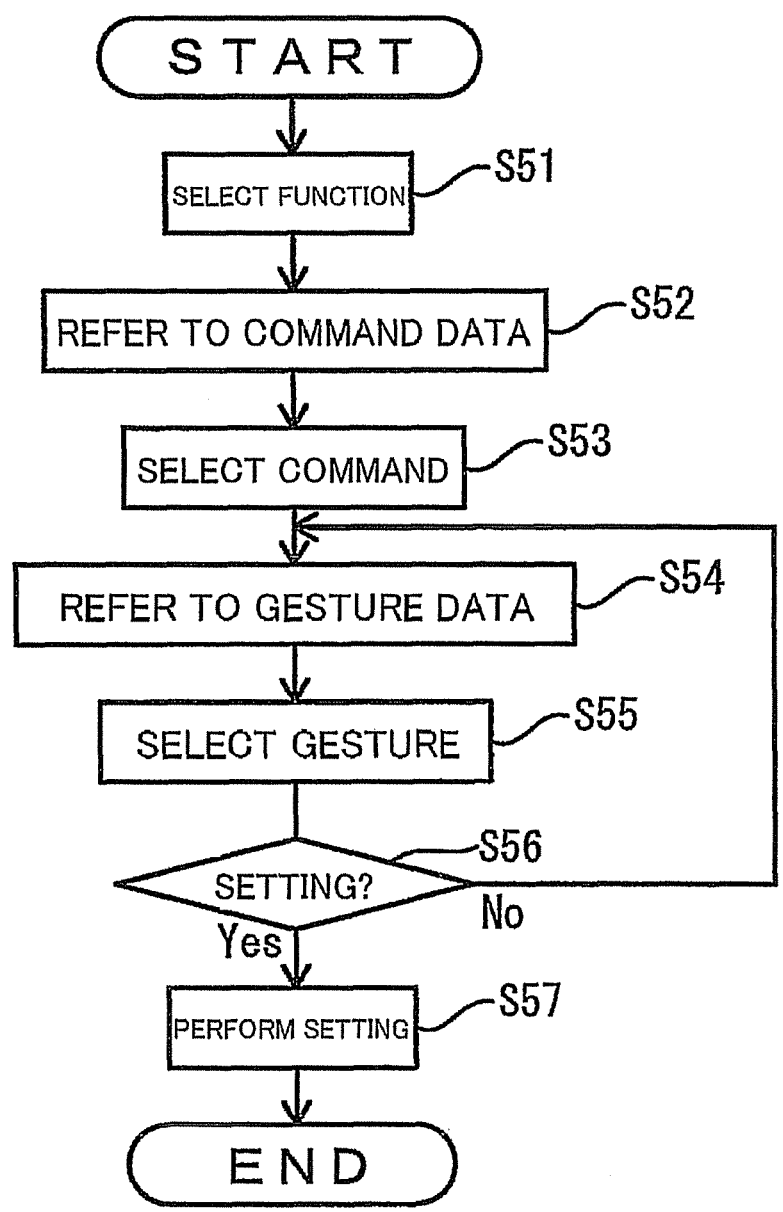
FIG. 20 is a flowchart illustrating an example of a setting process of a gesture command.

FIG. 20 is a flowchart illustrating an example of an associating process in which gesture data is recorded in the gesture data unit 455 by being associated with an operation of an application using the gesture data as a command.

In the present embodiment, a gesture-command setting function is selected from the functions displayed on the screen of a gesture setting application, in accordance with a user's operation (step S51). Next, in the application unit 459, an application operating command is called and referred to (step S52). The application operation includes any operations that are used in utilizing the application such as activating and closing the application, selecting and deciding the functions in the application, and the screen transition.

A command that is desired to be generated by a gesture is selected from the referred command data (step S53). Furthermore, gesture data is called from the gesture data unit 455 and referred to (step S54). A gesture that is desired to be associated with the command selected in step S53 is selected (step S55). The user determines whether or not setting of the selected gesture is performed (step S56). When setting of the selected gesture is performed (Yes at step S56), the gesture is recorded in the gesture data unit 455 in a state where gesture data is associated with an event to be generated by using the gesture data as a command (step S57). When the selected gesture is canceled (No at step S56), gesture data is selected again (step S54), and another gesture can be selected (step S55).

In the above embodiment, after the application operation command is called and selected, gesture data is associated with the selected application command. However, the present invention is not limited to this aspect. For example, after gesture data is called and selected, an application operation command may be associated with the selected gesture data.

Furthermore, for example, after an application operation command is called, gesture data may be directly recorded and associated with the application operation command.

(Rewriting of Gesture Command)

Figure 21:
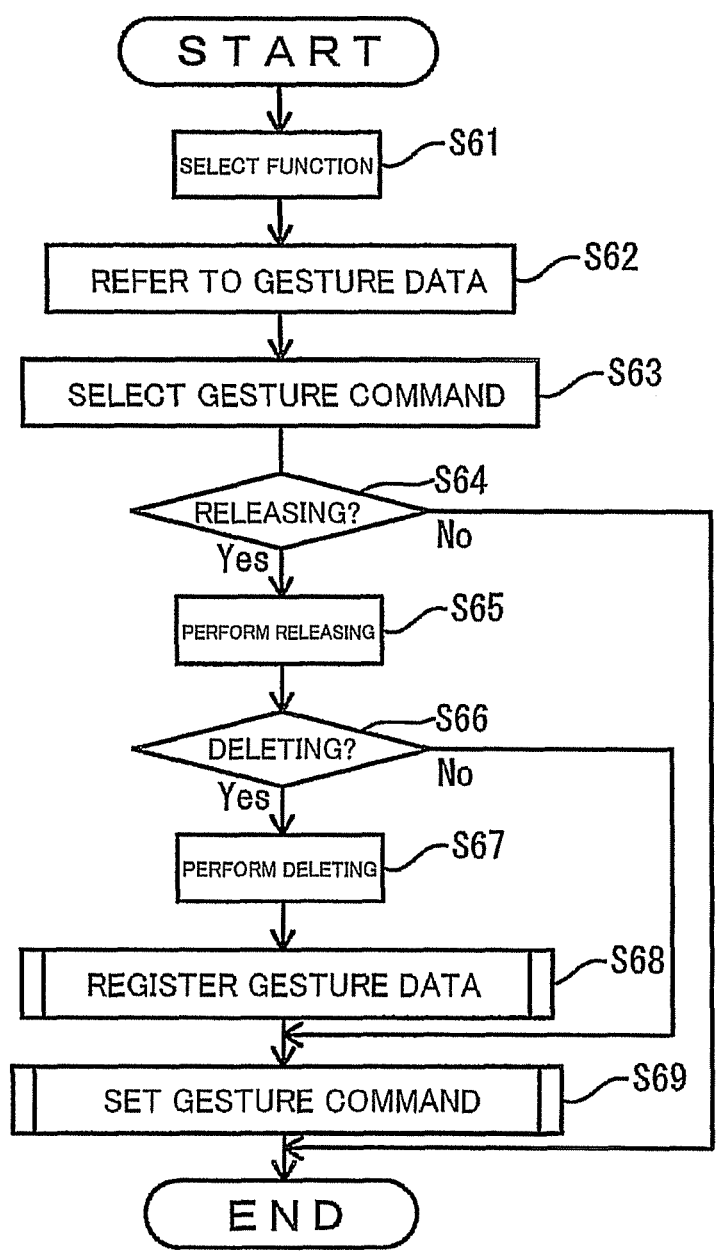
FIG. 21 is a flowchart illustrating an example of a rewriting process of a gesture command.

FIG. 21 is a flowchart illustrating an example of a process of rewriting a gesture command in the gesture data unit 455.

In the present embodiment, a gesture-command rewriting function is selected from the functions displayed on the screen of the gesture setting application in accordance with a user's operation (step S61). Next, gesture data is called from the gesture data unit 455 and referred to (step S62). A gesture command that is desired to be rewritten is selected (step S63), and whether or not the association of the gesture command with an application operation is released is determined (step S64). When the association is released (Yes at step S64), the releasing is performed so that the association of the gesture data forming the gesture command with the application operation is eliminated (step S65). When the association is not released (No at step S64), this process is ended.

After the association of the gesture data with the application operation is released in step S65, whether of not the gesture data itself the association of which is released is deleted is further determined (step S66). When the gesture data itself is deleted (Yes at step S66), the gesture data is deleted from the gesture data unit 455 (step S67).

When the gesture data is deleted in step S67, the gesture data registration process, which is described in FIG. 19, is performed (step S68). Subsequently, the gesture command-'setting process, which is described in FIG. 20, is performed so that a new gesture command is set (step S69).

In contrast, when the gesture data is not deleted (No at step S66), the gesture command setting process, which is described in FIG. 20, is performed and the gesture data is associated with another application operation so that a new gesture command is set (step S69).

(Operation of Application by Recognizing Set Gesture Command)

The gesture recognition method using gesture data in the gesture data unit 455 that has been recorded in the above manner is described with reference to step S1 to step S4 in FIG. 4. More specifically, as in the aforementioned registration of the gesture data, in step S2, a plurality of frames of external-shape image data of an object are obtained, and in step S3, information of a feature part of the external shape and the movable range thereof are obtained. In step S4, the feature part of the external shape and the movable range of the gesture data recorded in the gesture data unit 455 are compared with a feature part of an external shape and a movable range of a gesture to be recognized. The consistency of the data between them is determined so that which piece of the gesture data recorded in the gesture data unit 455 corresponds to the gesture to be recognized is determined.

Subsequently, as described in step S5, the application unit 459 performs a predetermined application operation by using the gesture recognized by the gesture recognition unit 456 as a command.

(View Example of Semi-transmissive Display)

Figure 22:
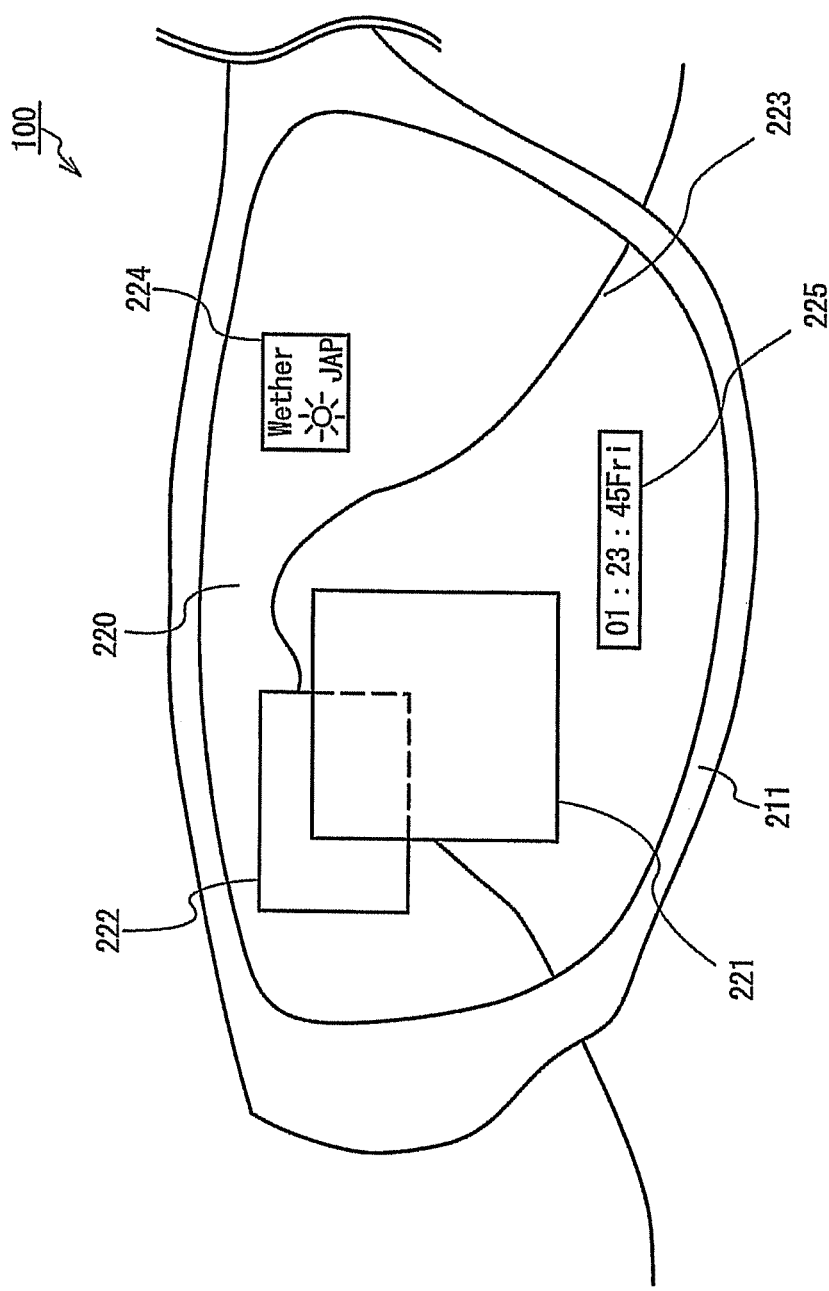
FIG. 22 is a schematic diagram illustrating an example of a view of the semi-transmissive display 220 of the glasses display device 100.

Next, FIG. 22 is a schematic diagram illustrating an example of a view of the semi-transmissive display 220 of the glasses display device 100.

As illustrated in FIG. 22, on the semi-transmissive display 220 of the glasses display device 100, an advertisement 221 is partially displayed, and a map 222 is further partially displayed. In addition, through the semi-transmissive display 220 of the glasses display device 100, scenery 223 is visually recognized. In addition, weather forecast 224 and time 225 are displayed thereon.

(Description of Field of View)

Next, an example of the view displayed on the semi-transmissive display 220 of the glasses display device 100 is described. FIG. 23(a) is a diagram for describing an example of the field of view of the semi-transmissive display 220, and FIG. 23(b) is a diagram for describing an example of the view of the semi-transparent display 220

Figure 23:
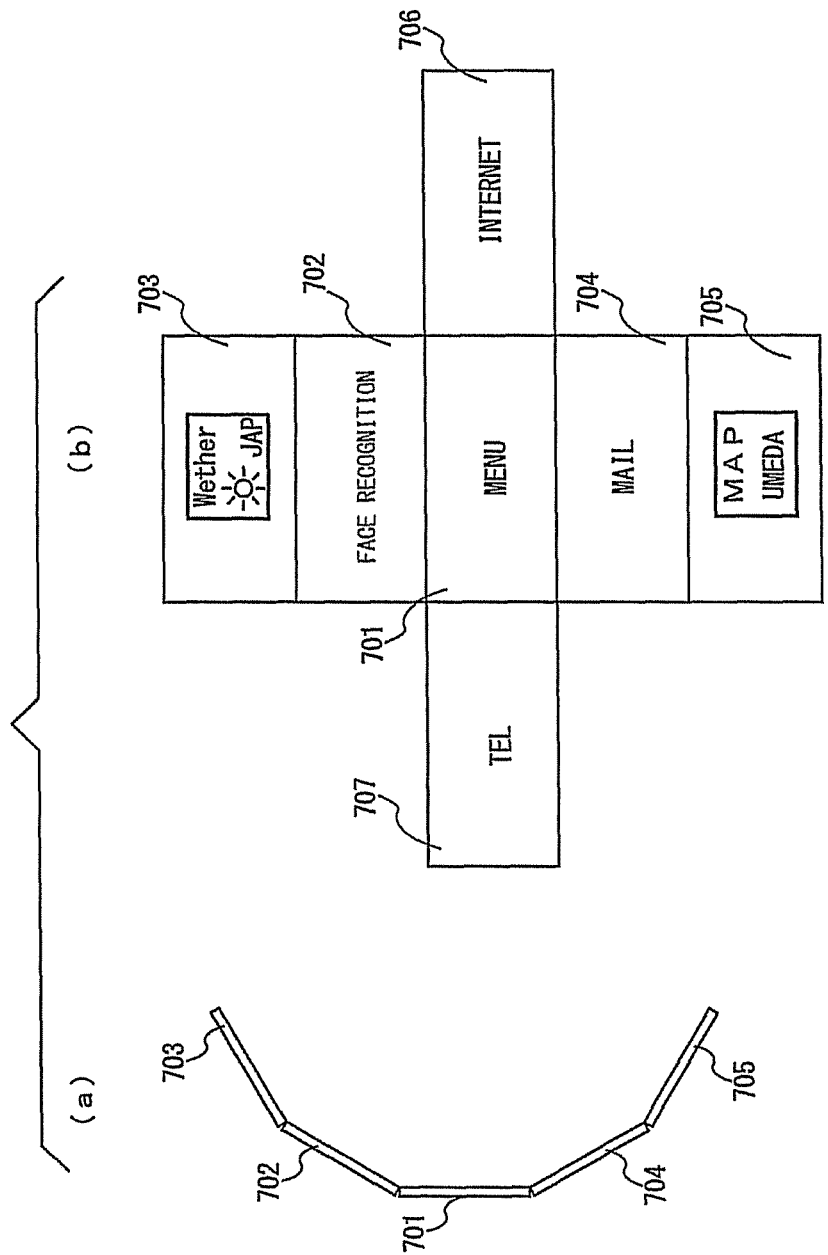
FIG. 23 is a schematic diagram illustrating an example (a) of a field of view of the semi-transmissive display 220 and an example (b) of the view of the semi-transparent display 220.

As illustrated in FIG. 23, in the present embodiment, the view that can be visually recognized on the glasses display device 100 includes a plurality of views 701 to 707. All the plurality of views are segments each constituting part of an integrated continuous image. Through smooth transition from one visually recognized portion to another visually recognized portion in the continuous image, the plurality of views are switchingly displayed without any discontinuity.

As illustrated in FIG. 23, the views 703, 702, 701, 704, and 705 are provided in the top-bottom direction, and the views 706 and 707 are respectively provided on the right side and the left side of the view 701. Note that, as a matter of course, the views 701 to 707 can be freely deleted or changed by the user, and other views can be further added by the user.

Note that, although the views 701 to 707 are a seamless continuous image in the present embodiment, the views to be switched may be discontinuous images independent of one another.

Specifically, in the case where the posture of the glasses display device 100 is in the horizontal direction, that is, in the case where the glasses display device 100 is attached to the user and where the user faces horizontally forward, the view 701 is displayed.

Subsequently, in the case where the glasses display device 100 is attached to the user and where the user faces obliquely upward at about 30 degrees with respect to a horizontal plane (that is, a plane parallel to the horizontal direction), the view 702 is displayed. That is, on the basis of a signal from at least one of the gyroscope unit 420 and the acceleration detection unit 430 in the glasses display device 100, which direction the user faces is recognized. Note that, for example, a screen of a face recognition application may be displayed as the view 702.

Further, in the case where the user faces obliquely upward at about 45 degrees with respect to the horizontal plane, the view 703 is displayed. Weather forecast may be displayed as the view 703. Moreover, other sky information may be displayed as the view 703, and, for example, a constellation image may also be displayed thereas depending on the time zone.

Similarly, in the case where the glasses display device 100 is attached to the user and where the user faces obliquely downward at about 30 degrees with respect to the horizontal plane, the view 704 (for example, an e-mail screen) is displayed. In the case where the user faces obliquely downward at about 45 degrees with respect to the horizontal plane, the view 705 (for example, a map) is displayed. In the case where the user faces rightward at about 30 degrees with respect to a vertical plane, the view 706 (for example, an Internet browser) is displayed. In the case where the user faces leftward at about 30 degrees with respect to the vertical plane, the view 707 (for example, a phone call screen) is displayed.

Moreover, although the switching among the view 701 to the view 707 is made on the basis of the signal from at least one of the gyroscope unit 420 and the acceleration detection unit 430 in the above description, not limited thereto, the switching thereamong may be made on the basis of the above-mentioned finger, palm, or arm recognition.

Further, when the user is walking, as a condition for making at least any of switches from the view 701 to the view 702, from the view 701 to the view 704, from the view 701 to the view 707, and from the view 701 to the view 706, the level of the signal from at least one of the gyroscope unit 420 and the acceleration detection unit 430 may be set to be higher. This can prevent switching from the view 701 to another view in a short time during the walk. Moreover, such setting that switching is not particularly made when the user suddenly turns around may be provided.

Meanwhile, the view 703 of sky information and the view 705 of map information may be panoramically displayed. In this case, the views 703 and 705 may be scrolled along with rightward and leftward movements.

(Specific Example of Event Generation)

Figure 24:
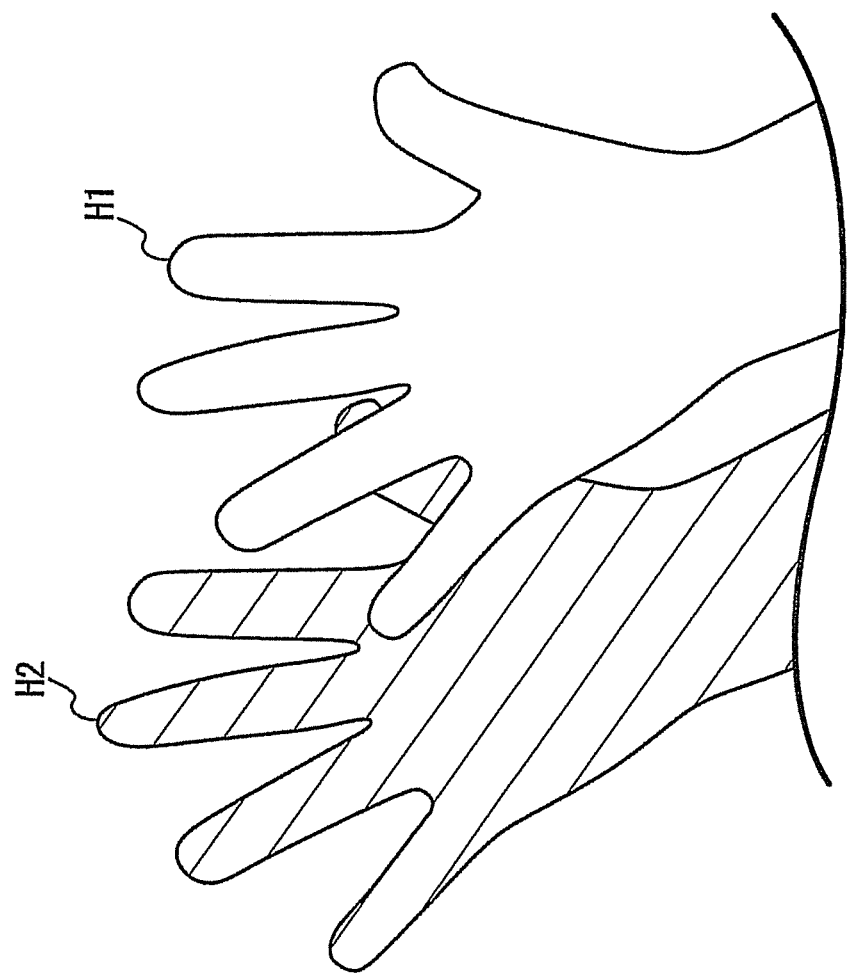
FIG. 24 is a schematic diagram illustrating an example of event generation.

Next, a predetermined event is generated in order to enable the user to easily recognize a difference between the case where the fingers, the palm, the hand, and the arm exist in the manipulation region 410c and the case where the fingers, the palm, the hand, and the arm exist in the gesture region 410g. Hereinafter, the predetermined event is described. FIG. 24 is a schematic diagram illustrating an example of the predetermined event generation, FIG. 25 is a schematic diagram illustrating another example of the event generation in FIG. 24, and FIG. 26 is a schematic diagram illustrating an example of another event generation.

First, as illustrated in FIG. 24, the shape of a hand H1 detected by the infrared ray detection unit 410 is displayed as a virtual image. Further, in the case where the user's hand is far from the manipulation region 410c, a shadow H2 having the shape of the hand H1 is displayed as an example of the event.

This enables the user to easily recognize that his/her hand exists in the gesture region 410g.

Figure 25:
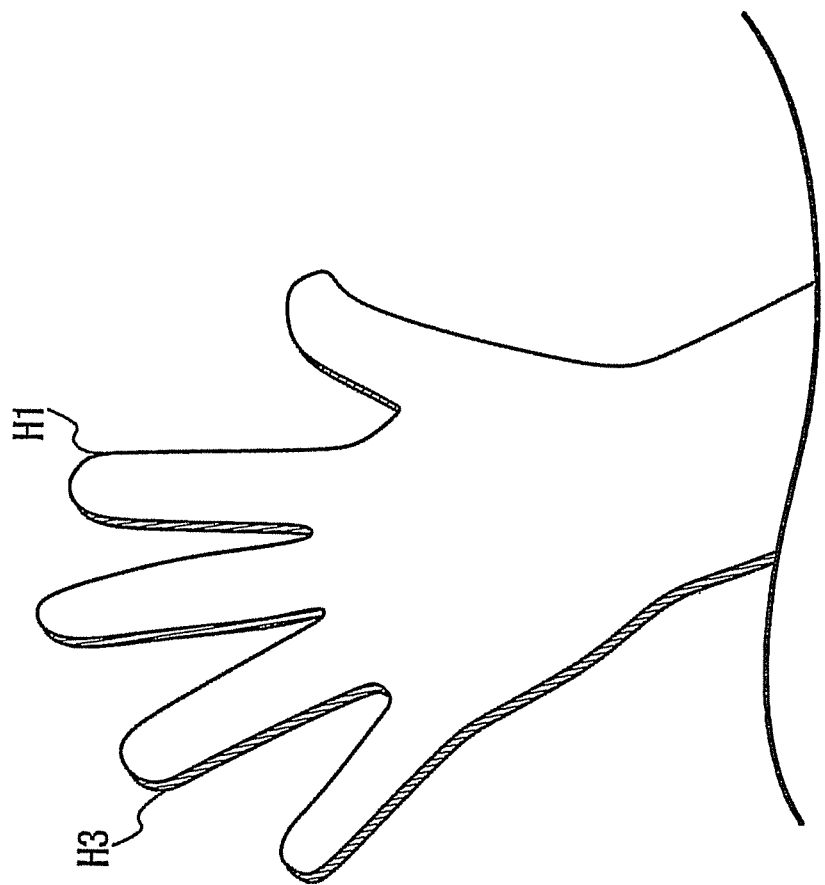
FIG. 25 is a schematic diagram illustrating another example of the event generation.
Figure 26:
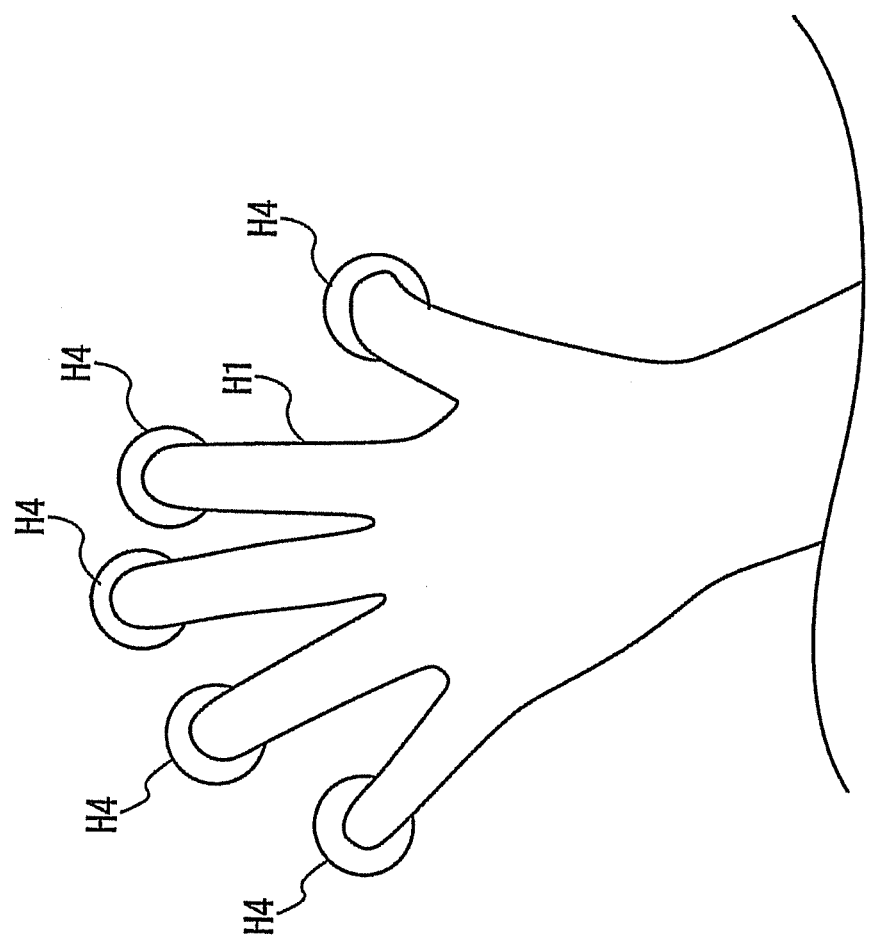
FIG. 26 is a schematic diagram illustrating another example of the event generation.

Subsequently, as illustrated in FIG. 25, the shape of the hand H1 detected by the infrared ray detection unit 410 is displayed as a virtual image, and a shadow H3 darker than the shadow H2 is displayed with a small area around the shape of the hand H1. Accordingly, the user can easily recognize that his/her hand more approaches the manipulation region 410c than the case of FIG. 24. Further, in the case where his/her hand exists in the manipulation region 410c, the shadows H2 and H3 are not displayed.

As a result, the user does not need to look for the manipulation region 410c through trial and error or gropingly. That is, the user can easily recognize the distance to the manipulation region 410c on the basis of the darkness of the shadow and the positional difference between the shape of the hand and the shadow.

Moreover, as illustrated in FIG. 26, in the case where the user's hand exists in the manipulation region 410c, circle views H4 may be respectively displayed on the finger tips.

Note that, although the event generation mode of displaying the shadows H2 and H3 and the circle views H4 is described above in the embodiment, not limited thereto, in the case where the user's hand exists in the manipulation region 410c, the displayed image may be rippled, the glasses display device 100 may be provided with a vibration generation device to generate vibrations, a sound may be generated, and the displayed image may be changed by at least any of blinking the displayed image and changing the lighting luminance. For example, the distance to the manipulation region 410c may be represented by the blinking interval, and the distance to the manipulation region 410c may be represented by the lighting luminance. For example, the blinking interval becomes longer with the increasing distance from the manipulation region 410c, and the blinking interval becomes shorter with the decreasing distance therefrom. Alternatively, the lighting luminance becomes lower with the increasing distance from the manipulation region 410c, and the lighting luminance becomes higher with the decreasing distance therefrom. Alternatively, the displayed image is lighted with a darker color (such as red, black, and purple) with the increasing distance from the manipulation region 410c, and the displayed image is lighted with a paler color (such as blue, yellow, and pink) with the decreasing distance therefrom. In this way, an arbitrary event that appeals to human senses (typified by a sense of sight, a sense of hearing, and a sense of touch) may be generated.

(Manipulation on Glasses Display Device)

A usage mode of the glasses display device 100 along with the above-mentioned finger, palm, and arm recognition and the above-mentioned event generation is described.

First, if the user places his/her hand in the manipulation region 410c, his/her hand is recognized, and the user can manipulate a virtual image view. For example, the user can enlarge or reduce the virtual image view, scroll the view, or select a point.

Figure 27:
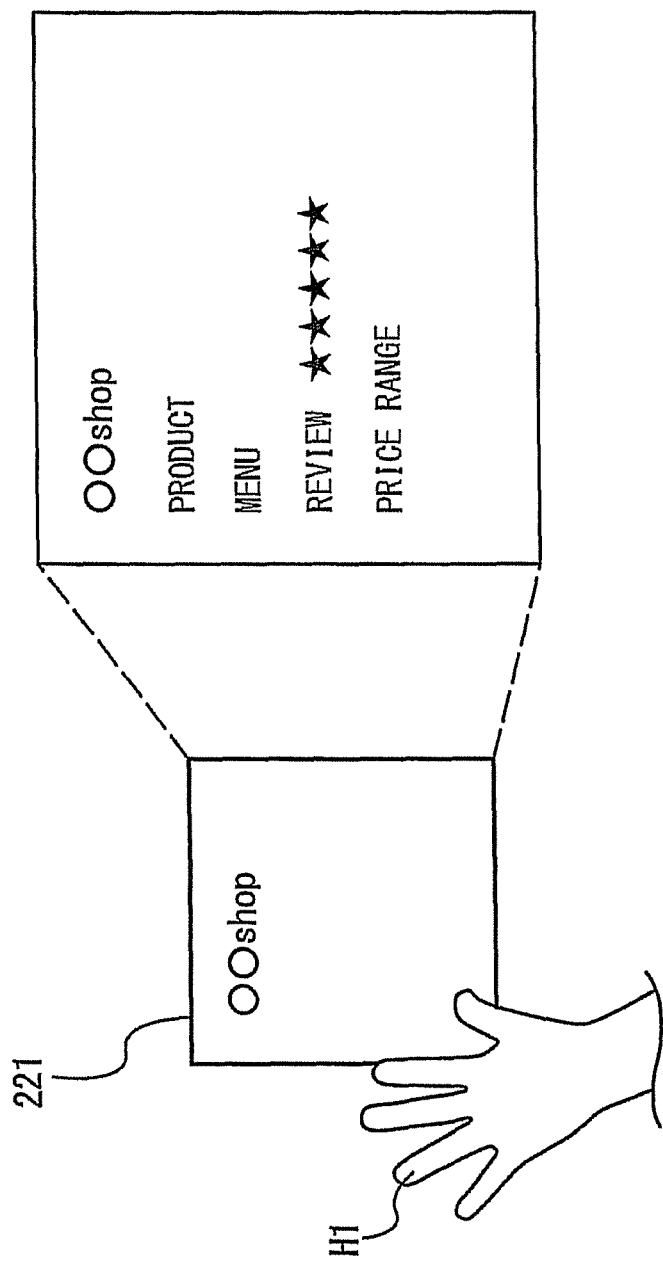
FIG. 27 is a schematic diagram illustrating an example of a manipulation on the glasses display device.

For example, as illustrated in FIG. 27, in the case where the user touches the view of the advertisement 221, an additional view may be displayed.

For example, information on products, services, and the like of a shop is displayed as the advertisement 221. In the case where the user touches the advertisement 221, further detailed information concerning the shop may be additionally displayed. For example, in the case where the shop is a restaurant, a main menu, user's reviews, a price range, and the like of the restaurant may be displayed.

Note that the advertisement 221 may be an image itself obtained by taking the shop by the camera unit 303, and may be recognition result information that is displayed on a shop recognition application screen as a result of automatically starting shop recognition on the basis of the image data of the shop taken by the camera unit 303.

(Display Based on Parody Mode)

Figure 28:
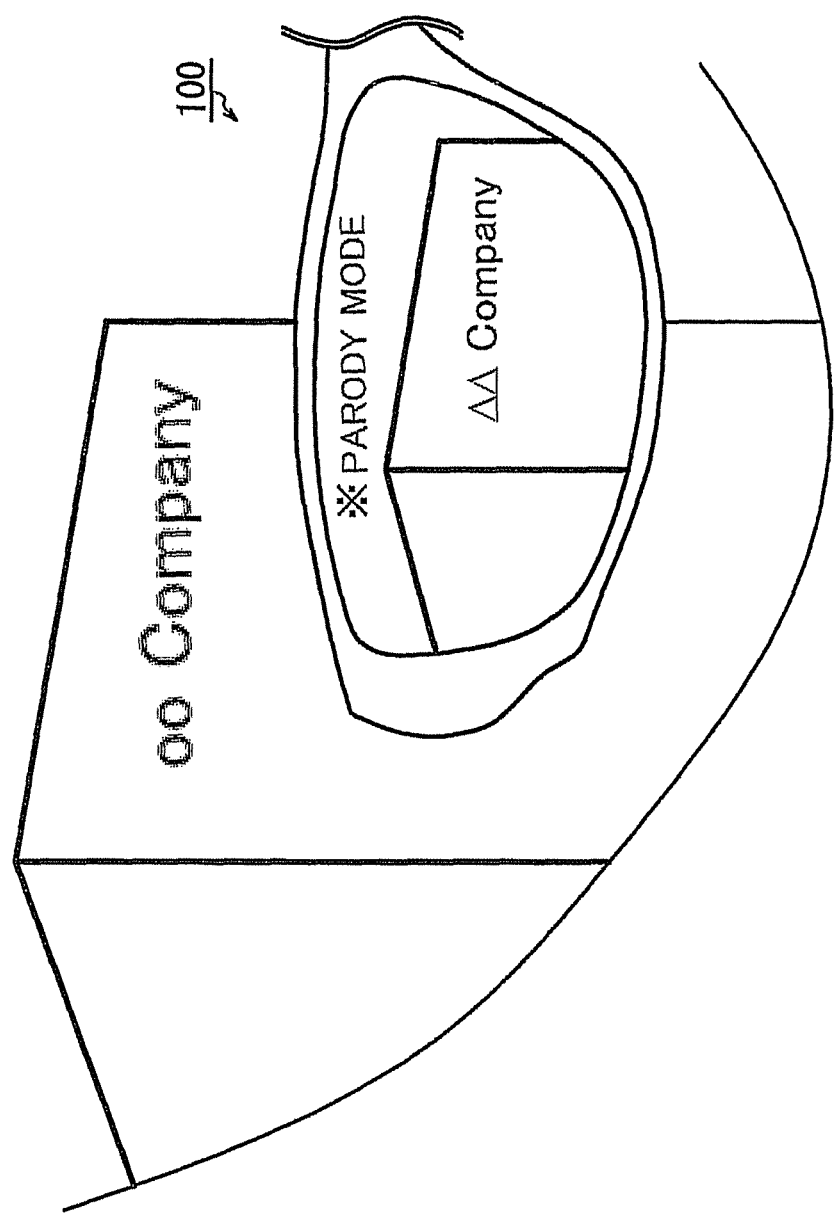
FIG. 28 is a schematic diagram illustrating another example of the manipulation on the glasses display device.

Moreover, as illustrated in FIG. 28, when a logo of one company (oo Company) is displayed on the semi-transmissive display 220, if the user touches the logo on the screen, information concerning another competitive or non-competitive company (oo Company) can be displayed. In this case, for example, a logo of the another company may be displayed as a parody mode.

(Display Based on Gesture Command)

Moreover, if the user makes a predetermined hand pose within the gesture region 410g, a preset operation is carried out. FIG. 29 to FIG. 36 are schematic diagrams each illustrating an example of the gesture recognition.

Figure 29:
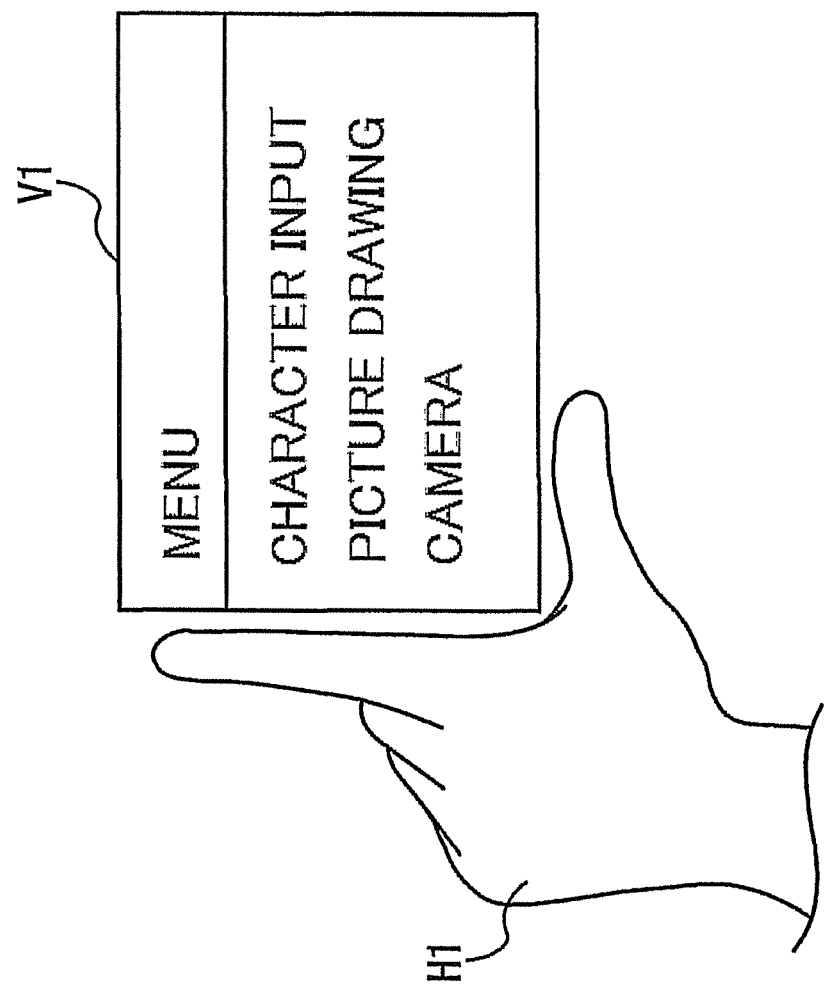
FIG. 29 is a schematic diagram illustrating an example of gesture recognition.

For example, as illustrated in FIG. 29, in the case where the user opens and stretches the thumb and the index finger of the closed hand H1 at 90 degrees to make an L-shaped sign, a menu screen V1 may be displayed between the thumb and the index finger.

Figure 30:
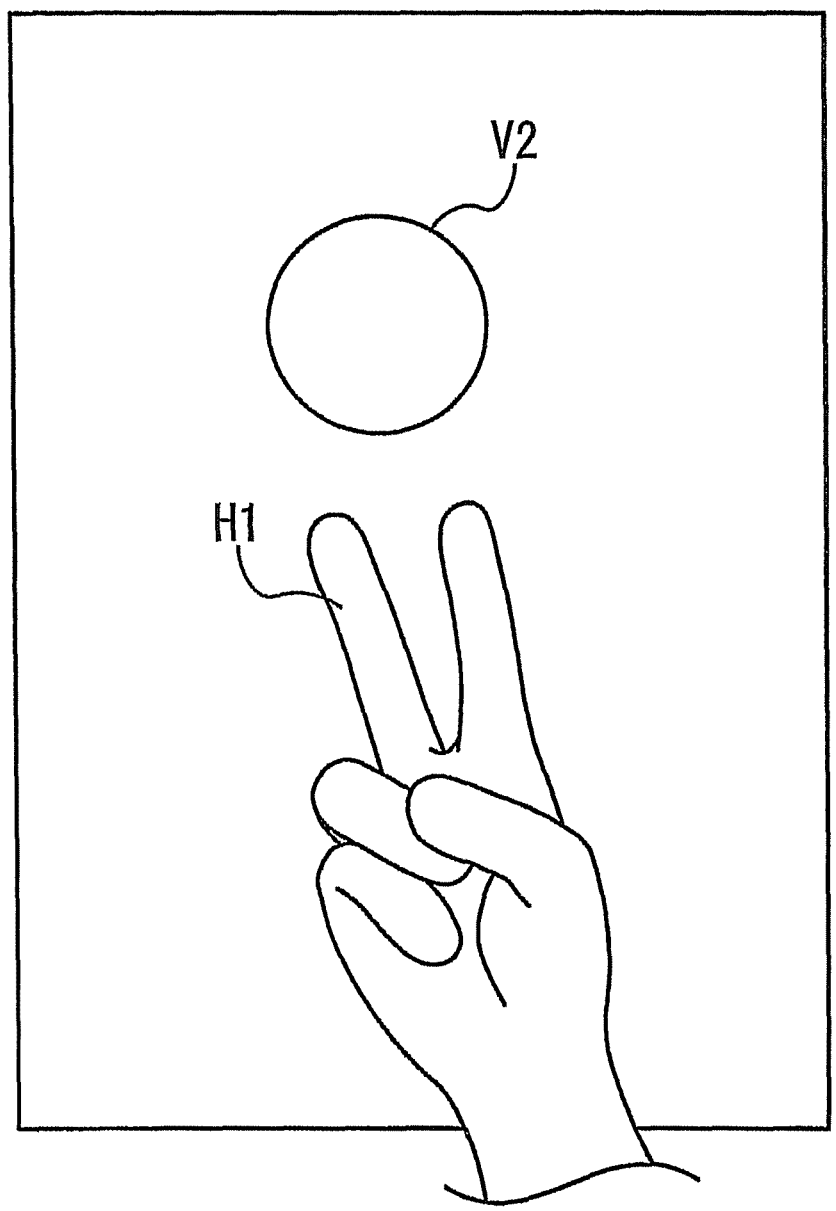
FIG. 30 is a schematic diagram illustrating another example of the gesture recognition.

Moreover, as illustrated in FIG. 30, in the case where the user opens and stretches the index finger and the middle finger of the closed hand H1 to make a so-called peace sign, a predetermined image V2 may be displayed between the index finger and the middle finger.

Figure 31:
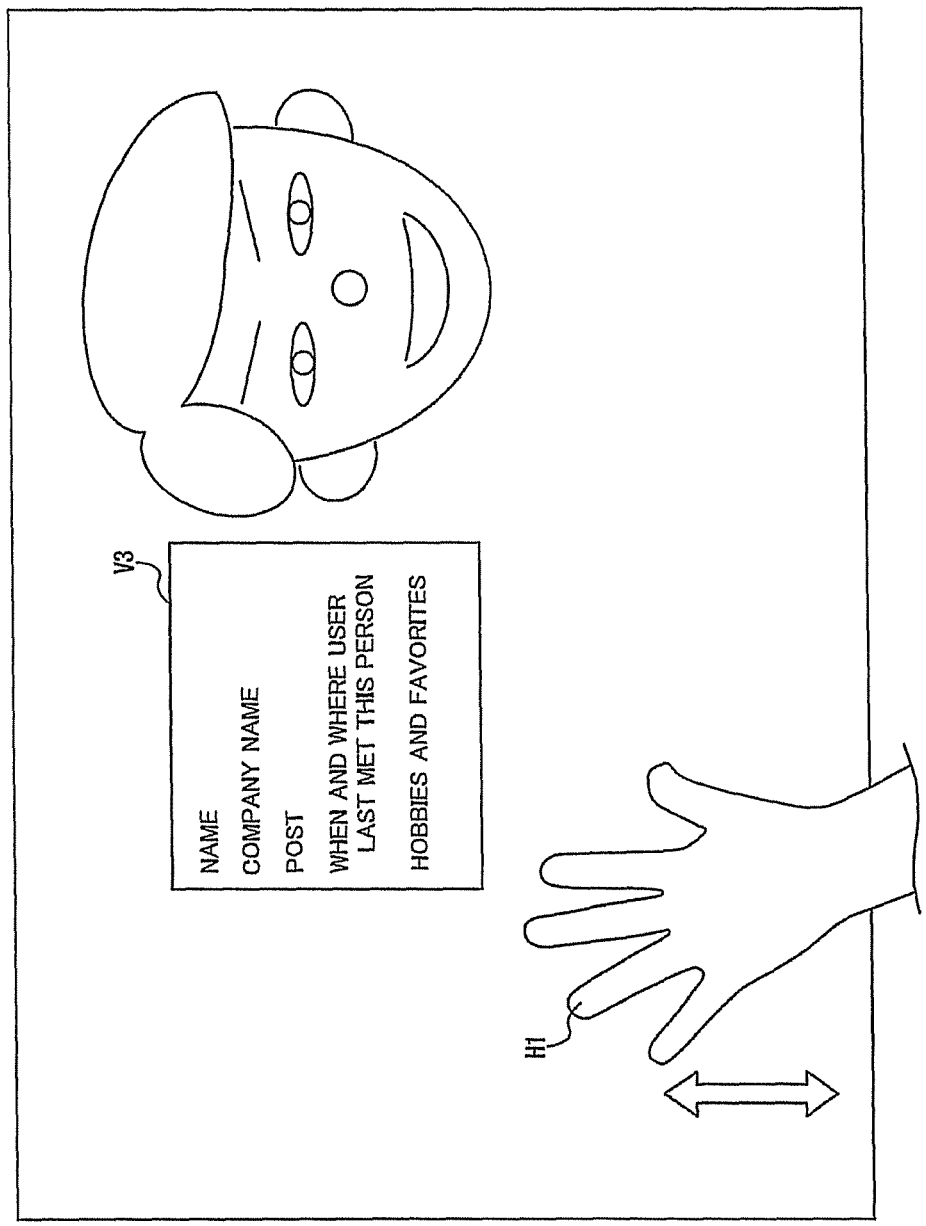
FIG. 31 is a schematic diagram illustrating another example of the gesture recognition.

Moreover, as illustrated in FIG. 31, in the case where the user makes a greeting action by moving the loosely opened hand H1 in an arrow direction, a face recognition application is automatically activated. On the basis of face data acquired by the camera unit 303, of a person whom the user gives the greeting, the face recognition is automatically started, and information on the name, the company name, the post, when and where the user last met this person, and the like is displayed on a face recognition application screen V3. Further, a flag is set each time the user meets the same person based on the recognition of the face recognition application, and the number of flags may be displayed on the face recognition application screen V3. In this case, the background, color, and the like of the face recognition application screen V3 may be changed depending on the number of flags.

Figure 32:
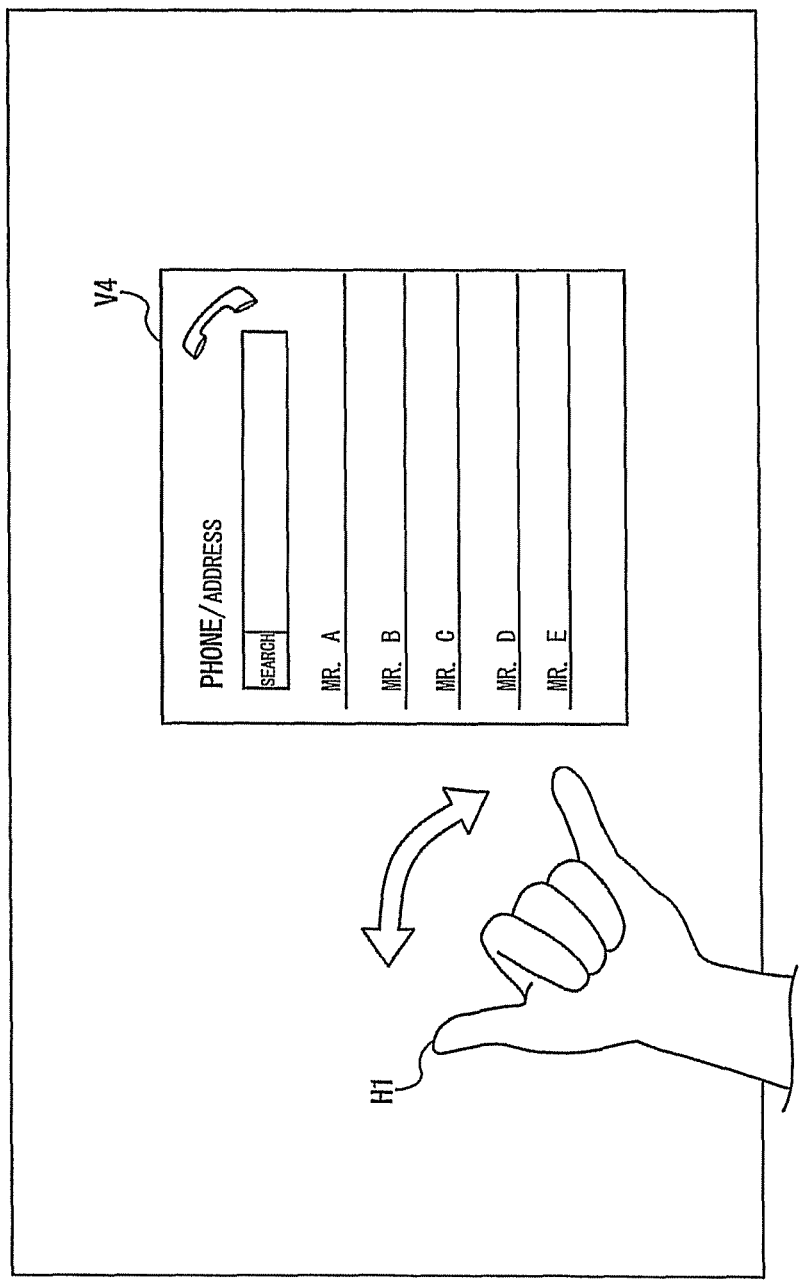
FIG. 32 is a schematic diagram illustrating another example of the gesture recognition.

Further, as illustrated in FIG. 32, in the case where the user opens the thumb and the little finger of the closed hand H1 to make a so-called aloha sign and waves the sign in the arrow directions, a phone application is automatically activated, and address book data V4 is displayed. The user can make a phone call to a predetermined person by manipulating the phone application.

Figure 33:
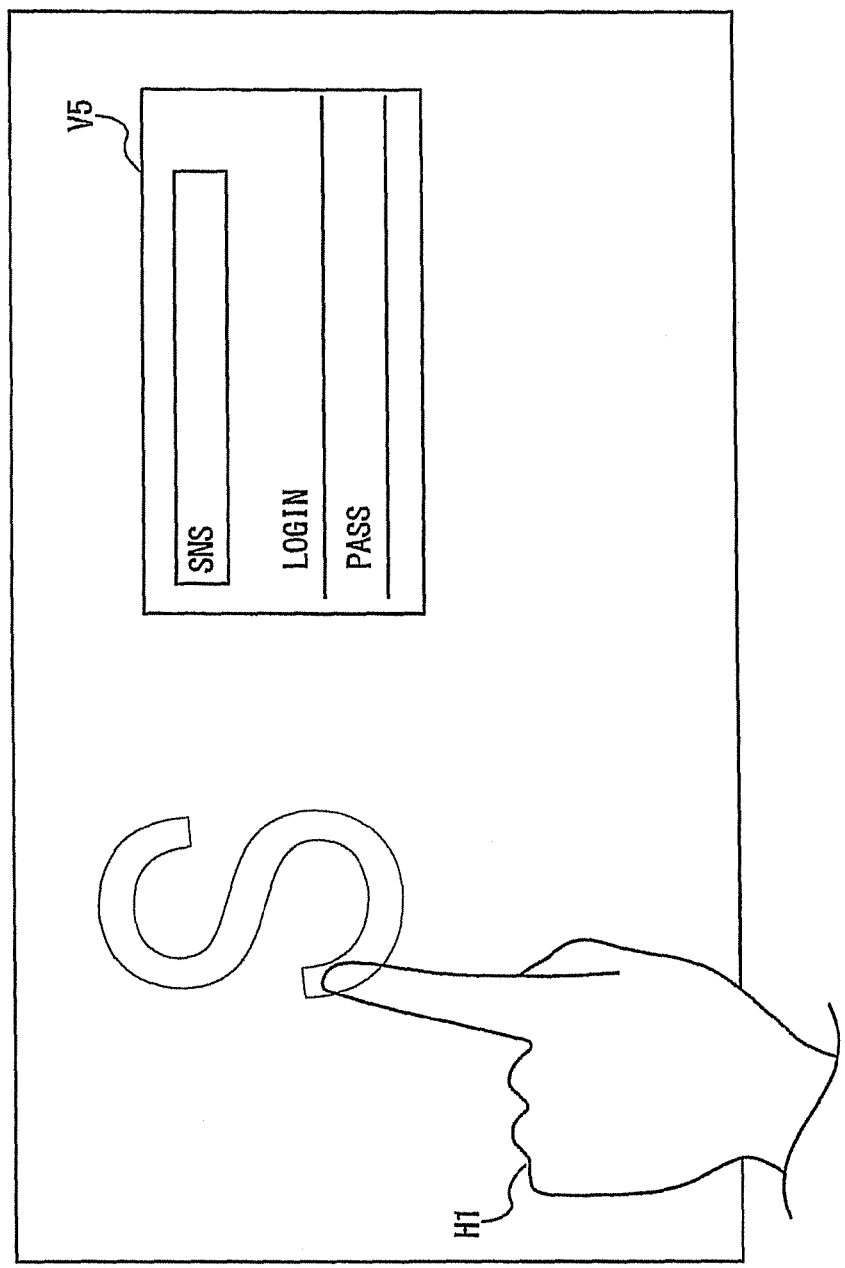
FIG. 33 is a schematic diagram illustrating another example of the gesture recognition.

Moreover, as illustrated in FIG. 33, in the case where the user draws an alphabetical letter S with a finger of the hand H1, a social networking service (SNS) application is automatically activated, and a SNS application screen V5 can be displayed.

Figure 34:
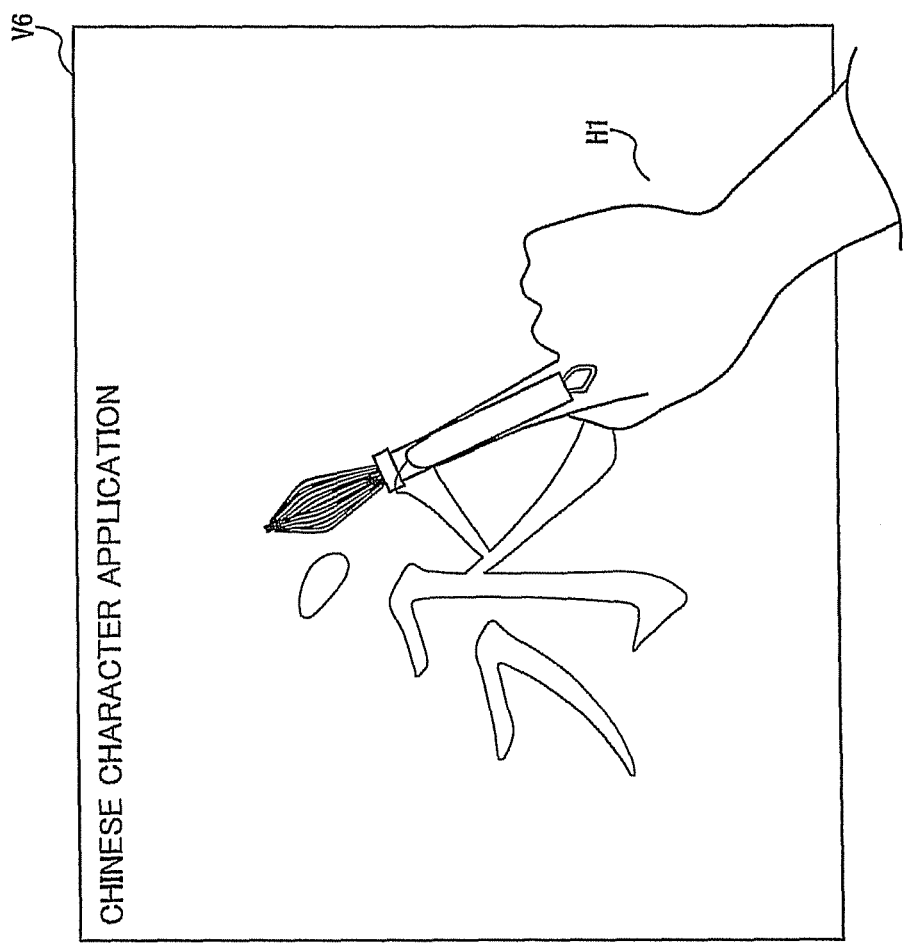
FIG. 34 is a schematic diagram illustrating another example of the gesture recognition.

Further, as illustrated in FIG. 34, in the case where the user activates a Chinese character application and causes the application to recognize the index finger of the hand H1, an image of an ink brush is further additionally displayed at the position of the index finger, and the user can practice writing Chinese characters on a Chinese character practice application screen V6.

Figure 35:
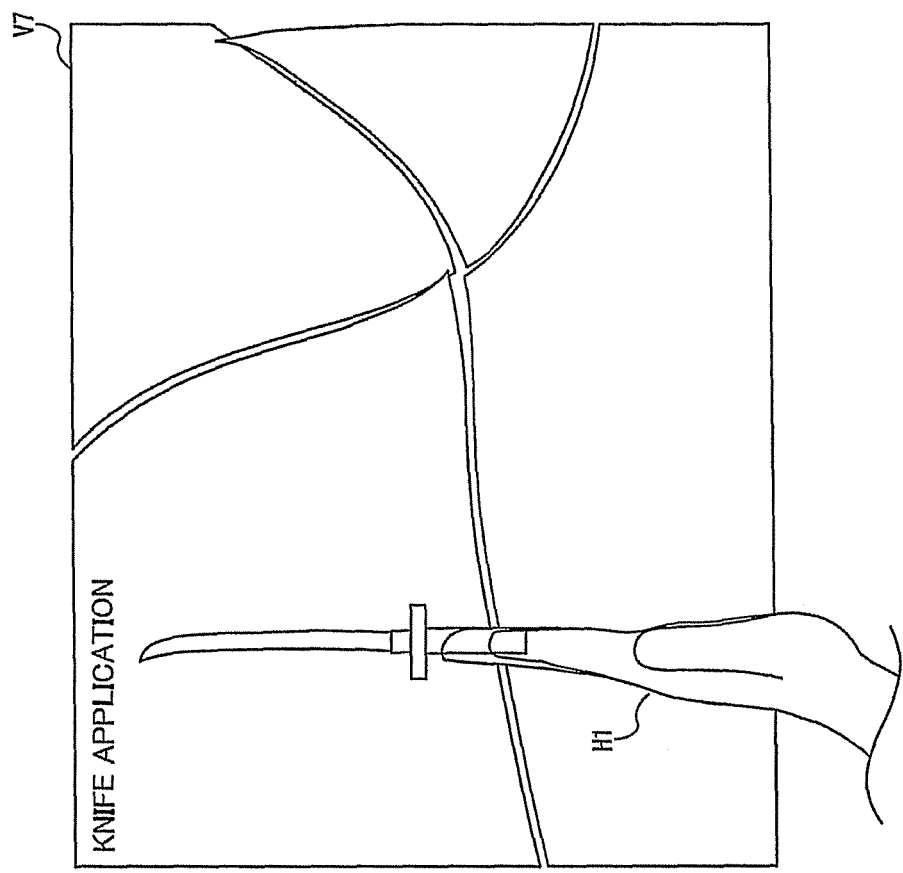
FIG. 35 is a schematic diagram illustrating another example of the gesture recognition.

Moreover, as illustrated in FIG. 35, in the case where the user makes the hand H1 into a hand-knife shape, a knife application is activated, an image of a knife is further additionally displayed at the position of the knife-shaped hand, and the user can cut a virtual image display screen V7.

Figure 36:
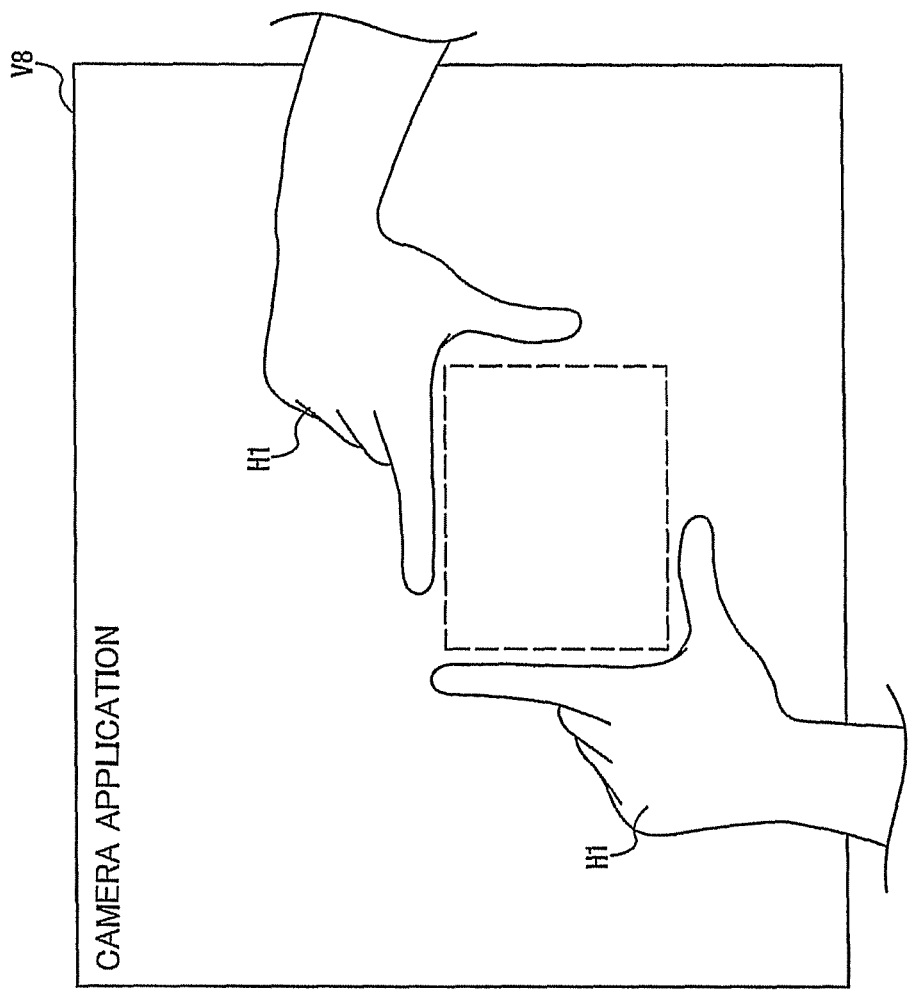
FIG. 36 is a schematic diagram illustrating another example of the gesture recognition.

Moreover, as illustrated in FIG. 36, in the case where the user forms a quadrangle with fingers of both the hands H1, a camera application is automatically activated, and an image of scenery or the like within an image taking frame extracted from the formed quadrangle may be taken on a camera application screen V8.

As described above, the glasses display device 100 according to the present invention detects the external shape of the hand H1 expressing the predetermined gesture with the infrared ray detection unit 410, analyzes the external-shape feature part of the hand H1 expressing the predetermined gesture and the value of at least either the position or the direction of the external-shape feature part from the detected external shape, records the analysis result in the gesture data unit 455 so that gesture data can be rapidly and simply obtained and stocked. For example, even if no marker is attached to the hand H1 in advance, a form expressing a gesture is read from the external shape of the hand H1. Thus, the gesture data can be rapidly and simply obtained and stocked.

The gesture data recorded in the gesture data unit 455 can be deleted so that the improved customizing property can be achieved.

The predetermined gesture data recorded in the gesture data unit 455 is associated with the predetermined application operation so that the gesture data can be used as a command for performing the predetermined application operation.

The association of the predetermined gesture data recorded in the gesture data unit 455 with the predetermined application operation can be released so that a new gesture command that is obtained by associating the gesture data with another operation can be created easily. Thus, the further improved customizing property can be achieved.

According to the glasses display device 100 of the present invention, an operation included in a gesture of the hand H1 can be registered simply.

According to the glasses display device 100 of the present invention, a stationary sign included in a gesture of the hand H1 can be registered simply.

According to the glasses display device 100 of the present invention, a gesture performed by part of a human body including the hand H1 can be registered simply. A gesture can be registered depending on physical features of a user.

For example, even when a user has lost one hand due to a war or an accident, the data of a gesture using both hands that has been recorded in the gesture data unit 455 is changed and data of a gesture that can be expressed by the user with one hand can be recorded again so that a predetermined operation can be performed in the similar manner.

According to the glasses display device 100 of the present invention, the external-shape data of the hand H1 having the predetermined form may be obtained with the moving-image photographing device so that a plurality of pieces of data of the serial external shape of an object having a predetermined form can be obtained. Thus, for example, setting of a gesture including an operation can be performed. In contrast, a gesture of a stationary sign that does not intend the transition of an operation can be set in such a way that a variety of forms that can be acceptable as the gesture are included.

According to the glasses display device 100 of the present invention, the external-shape data of the hand H1 having the predetermined form may be obtained with the still-image photographing device so that a plurality of pieces of data of an external shape of an object having a predetermined form can be obtained. Thus, for example, setting of a gesture including an operation can be performed. In contrast, a gesture of a stationary sign that does not intend the transition of an operation can be set in such a way that a variety of forms that can be acceptable as the gesture are included.

According to the glasses display device 100 of the present invention, for example, the number, the position and the angle of the extending fingers of the hand H1 and the angle of the arm specify the external-shape feature part of the hand H1 expressing a gesture so that more precise gesture data can be registered simply.

According to the glasses display device 100 of the present invention, the aforementioned gesture registration device is included so that registration of gestures can be performed with the device itself attached to a body. Furthermore, for example, registration of gestures by both hands can be performed because the both hands are free.

In the present invention, the infrared ray detection unit 410 corresponds to the "external-shape detecting unit", the hand H1 and the fingers of the hand H1 correspond to the "object", the depth map processor unit 452 and the image processing unit 453 correspond to the "analyzing unit", the gesture data unit 455 corresponds to the "recording unit", the operation system 400 corresponds to the "gesture registration device", and the glasses display device 100 corresponds to the "head-mounted display device".

A preferred embodiment of the present invention has been described hereinabove, but the present invention is not limited to only the embodiment. It should be understood that various other embodiments are possible without departing from the spirit and scope of the present invention. Further, operations and effects produced by the configuration of the present invention are described in the present embodiment, but these operations and effects are given as examples, and are not intended to limit the present invention.

FIG. 4
S1 PERFORM DEPTH COMPUTING
S2 PROCESS TAKEN IMAGE DATA
S3 RECOGNIZE OUTER SHAPE
S4 RECOGNIZE GESTURE
S5 CARRY OUT EVENT
S6 VIRTUALLY DISPLAY IMAGE
FIG. 14
S11 RECOGNIZE MAXIMUM REGION
S12 DETERMINE DISPLAY POSITION OF VIRTUAL IMAGE DISPLAY REGION
S13 SET MAXIMUM REGION OF GESTURE REGION
S14 PERFORM ROUNDING PROCESS
S15 DISPLAY RECTANGULAR IMAGE
S16 DISPLAY INSTRUCTION TO USER
S17 AUTOMATICALLY ADJUST CORRELATION
FIG. 16
S21 PERFORM DEVICE INITIALIZATION
S22 DETECT BY INFRARED RAY CAMERA
S23 REPLACE WITH DISTANCE
S24 CREATE DEPTH MAP
S25 BINARIZE IMAGE DATA
S26 CREATE POLYGON
S27 EXTRACT OUTER SHAPE
S28 CREATE CONVEX HULL
S29 CALCULATE TIP POINT
S30 CALCULATE BASE POINT
S31 EXTRACT SKELTON
S32 COMPARE WITH PREVIOUS SEVERAL FRAMES
S33 DELIVER EVENT
S34 BEHAVE IN ACCORDANCE WITH EVENT
S35 REQUEST DRAWING
S36 CORRECT DISPLAYED IMAGE
S37 PERFORM DISPLAY PROCESS
FIG. 19
S41 SELECT FUNCTION
S42 PHOTOGRAPHING STANDBY
S43 PHOTOGRAPHING
S44 ANALYZE FEATURE PART
S45 ANALYZE POSITION AND/OR ANGLE
S46 RECORDING?
S47 PERFORM RECORDING
FIG. 20
S51 SELECT FUNCTION
S52 REFER TO COMMAND DATA
S53 SELECT COMMAND
S54 REFER TO GESTURE DATA
S55 SELECT GESTURE
S56 SETTING?
S57 PERFORM SETTING
FIG. 21
S61 SELECT FUNCTION
S62 REFER TO GESTURE DATA
S63 SELECT GESTURE COMMAND
S64 RELEASING?
S65 PERFORM RELEASING
S66 DELETING?
S67 PERFORM DELETING
S68 REGISTER GESTURE DATA
S69 SET GESTURE COMMAND
FIG. 23
1 FACE RECOGNITION
FIG. 27
1 PRODUCT
2 MENU
3 REVIEW
4 PRICE RANGE
FIG. 28
1 ○○ Company
2 PARODY MODE
3 △△ Company
FIG. 29
1 MENU
2 CHARACTER INPUT
3 PICTURE DRAWING
4 CAMERA
FIG. 31
1 NAME
2 COMPANY NAME
3 POST
4 WHEN AND WHERE USER LAST MET THIS PERSON
5 HOBBIES AND FAVORITES
FIG. 32
1 ADDRESS
2 SEARCH
3 MR. A
4 MR. B
5 MR. C
6 MR. D
7 MR. E
FIG. 34
1 CHINESE CHARACTER APPLICATION

FIG. 35
1 KNIFE APPLICATION
FIG. 36
1 CAMERA APPLICATION

The invention claimed is:

1. A gesture registration device comprising:
an external-shape detecting unit that detects an external shape of an object having a predetermined form comprising at least a finger, a palm and a hand;
an analyzing unit that performs, from the detected external shape of the object comprising at least the finger, the palm, and the hand in a three-dimensional space having imperfect spherical shapes about a center of rotation of which is a right shoulder joint and a left shoulder joint of a user, respectively, at least analysis of an external-shape feature part by a tip point of the finger and a base point of the finger by using finger recognition, by palm recognition by using a maximum inscribed circle and by thumb recognition by using the palm recognition, and analysis of a value for at least either a position or a direction of the external-shape feature part;
a recording unit that records a result by the analysis unit as gesture data; and
an associating unit that causes the recording unit to record the gesture data in association with a predetermined operation.

2. The gesture registration device according to claim 1, further comprising a deleting unit that deletes the gesture data from the recording unit.

3. The gesture registration device according to claim 1, further comprising:
a releasing unit that releases association of the gesture data with the predetermined operation.

4. The gesture registration device according to claim 1, wherein the external-shape detecting unit detects a serial external shape of the object varying with time, and
the analyzing unit further performs analysis of a time variation of the external-shape feature part.

5. The gesture registration device according to claim 1, wherein the external-shape detecting unit detects the external shape of the object a plurality of times.

6. The gesture registration device according to claim 1, wherein the external-shape detecting unit is a moving-image photographing device, and
the external-shape detecting unit detects a serial external shape by continuing to image the object having the predetermined form for a predetermined time.

7. The gesture registration device according to claim 1, wherein the external-shape detecting unit is a still-image photographing device, and
the external-shape detecting unit detects a plurality of the external shapes by imaging the object having the predetermined form a plurality of times.

8. The gesture registration device according to claim 1, wherein the external-shape feature part is at least any one of a number, a position, an angle of fingers having a predetermined form, and an angle of an arm.

9. A head-mounted display device comprising the gesture registration device according to claim 1.

10. A non-transitory computer readable medium storing thereon a gesture registration program comprising instructions that when executed by a processor initiates processes comprising: an external-shape detection process of detecting an external shape of an object having a predetermined form comprising at least a finger, a palm, and a hand;
an analysis process of analyzing, from the detected external shape of the object comprising at least the finger, the palm and the hand in a three-dimensional space having imperfect spherical shapes about a center of rotation of which is a right shoulder joint and a left shoulder joint of a user, respectively, at least analysis of an external-shape feature part by a tip point of the finger and a base point of the finger by using finger recognition, by palm recognition by using a maximum inscribed circle and by thumb recognition by using the palm recognition, and analysis of a value for at least either a position or a direction of the external-shape feature part;
a recording process of recording a result in the analysis process as gesture data; and
an association process of causing a recording unit to record the gesture data in association with a predetermined operation.

11. The non-transitory computer readable medium according to claim 10, further comprising a deletion process of deleting the gesture data.

12. The non-transitory computer readable medium according to claim 10, further comprising a release process of releasing association of the gesture data with the predetermined operation.

13. The non-transitory computer readable medium according to claim 10, wherein the external-shape detection process is a moving-image photographing process, and
the external-shape detection process includes a process of detecting a serial external shape by continuing to image the object having the predetermined form for a predetermined time to detect a series of contours.

14. The non-transitory computer readable medium according to claim 10, wherein the external-shape detection process is a still-image photographing process, and
the external-shape detection process includes a process of detecting a plurality of the external shapes by imaging the object having the predetermined form a plurality of times.

15. A gesture registration method comprising:
an external-shape detection step in which an external shape of an object having a predetermined form comprising at least a finger, a palm, and a hand is detected;
an analysis step in which, from the detected external shape of the object comprising at least the finger, the palm and the hand in a three-dimensional space having imperfect spherical shapes about a center of rotation of which is a right shoulder joint and a left shoulder joint of a user, respectively, at least analysis of an external-shape feature part by a tip point of the finger and a base point of the finger by using finger recognition, by palm recognition by using a maximum inscribed circle and by thumb recognition by using the palm recognition, and analysis of a value of at least either a position or a direction of the external-shape feature part, are performed;
a recording step in which a result in the analysis step is recorded as gesture data; and
an association step of causing a recording unit to record the gesture data in association with a predetermined operation.

16. The gesture registration method according to claim 15, further comprising a deletion step in which the gesture data is deleted.

17. The gesture registration method according to claim 15, further comprising a release step in which association of gesture data indicating the predetermined form with the predetermined operation is released.

18. The gesture registration method according to claim 15, wherein the external-shape detection step is a moving-image photographing step, and includes a step in which a serial external shape is detected by continuing to image the object having the predetermined form for a predetermined time.

19. The gesture registration method according to claim 15, wherein the external-shape detection step is a still-image photographing step, and includes a step in which a plurality of the external shapes are detected by imaging the object having the predetermined form a plurality of times.

* * * * *